United States Patent
Yagyu

[19]
[11] Patent Number: 5,856,814
[45] Date of Patent: Jan. 5, 1999

[54] DRIVING METHOD FOR DISPLAY APPARATUS

[76] Inventor: Mineto Yagyu, c/o Canon Kabushiki Kaisha, 3-30-2 Shimomaruko, Ohta-ku, Tokyo, Japan

[21] Appl. No.: 690,997

[22] Filed: Aug. 1, 1996

[30] Foreign Application Priority Data

Aug. 2, 1995 [JP] Japan .................................. 7-197539
Aug. 3, 1995 [JP] Japan .................................. 7-198656

[51] Int. Cl.$^6$ .................................................. G09G 3/36
[52] U.S. Cl. .................................. 345/89; 345/87; 349/25
[58] Field of Search .............................. 345/147, 87, 89, 345/102; 349/25, 29, 173, 85, 30

[56] References Cited

U.S. PATENT DOCUMENTS

| | | | |
|---|---|---|---|
| 4,712,877 | 12/1987 | Okada et al. | 350/350 |
| 4,747,671 | 5/1988 | Takahashi et al. | 350/336 |
| 4,796,980 | 1/1989 | Kaneko et al. | 350/350 |
| 5,130,830 | 7/1992 | Fukushima et al. | 359/72 |
| 5,221,980 | 6/1993 | Yamamoto et al. | 359/56 |
| 5,548,420 | 8/1996 | Koshimizu et al. | 359/44 |

FOREIGN PATENT DOCUMENTS

| | | |
|---|---|---|
| 0125692 | 11/1984 | European Pat. Off. . |
| 361981A2 | 4/1990 | European Pat. Off. . |
| 453033A1 | 10/1991 | European Pat. Off. . |
| 0512842 | 11/1992 | European Pat. Off. . |
| 0514083 | 11/1992 | European Pat. Off. . |
| 0573989 | 12/1993 | European Pat. Off. . |
| 5688193 | 7/1981 | Japan . |

OTHER PUBLICATIONS

Lipton et al.: "Laser scanning, data processing and display" Conference on Laser and Electrooptical Systems, 7–9 Feb. 1978, San Diego, CAL. USA, pp. 32–33, XP002045299 * FIGURE 2 *.

*Primary Examiner*—Dennis-Doon Chow
*Attorney, Agent, or Firm*—Fitzpatrick, Cella, Harper & Scinto

[57] ABSTRACT

A display apparatus includes an optical modulation device comprising a pair of electrodes, and a photoconductor layer and an optical modulation substance layer between the electrodes, a signal light source for supplying light data carrying gradation data to the photoconductor layer, and a readout light source for supplying readout light for reading out image data to the optical modulation substance layer. The display apparatus is driven by a method including: scanningly supplying the light data to the photoconductor layer, and scanningly supplying the readout light to the optical modulation substance layer. Preferably, the lighting time of the readout light source is controlled to modulate an overlapping time between a period of the optical modulation substance assuming a prescribed optical state and the lighting time depending on given gradation data.

32 Claims, 27 Drawing Sheets

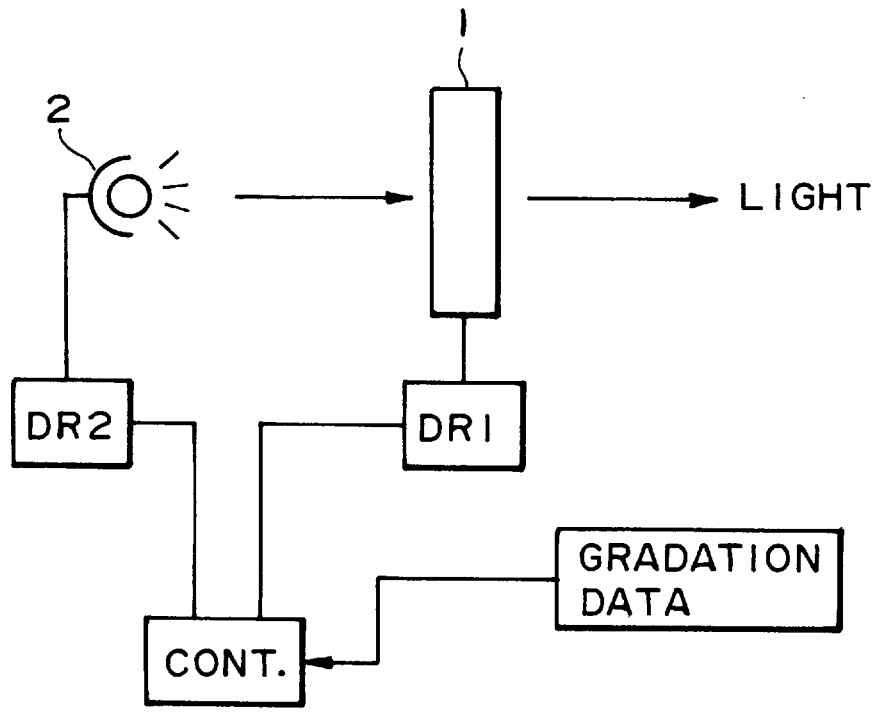
F I G. 1
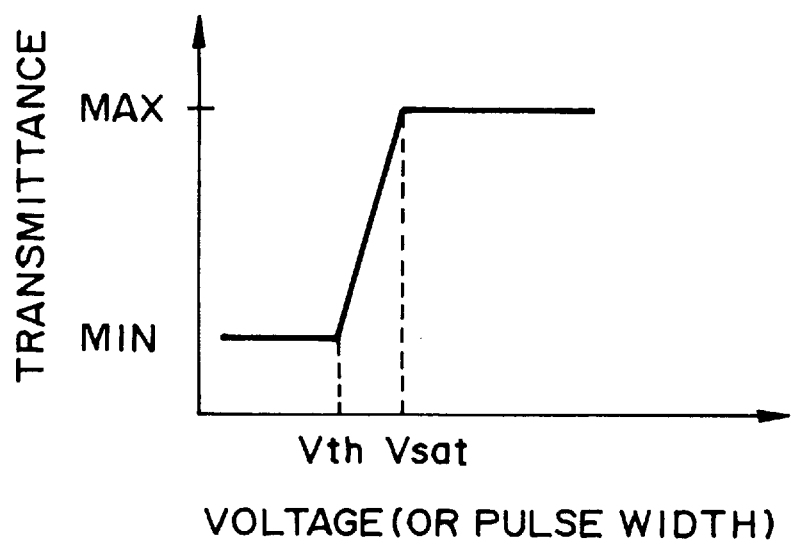
F I G. 2

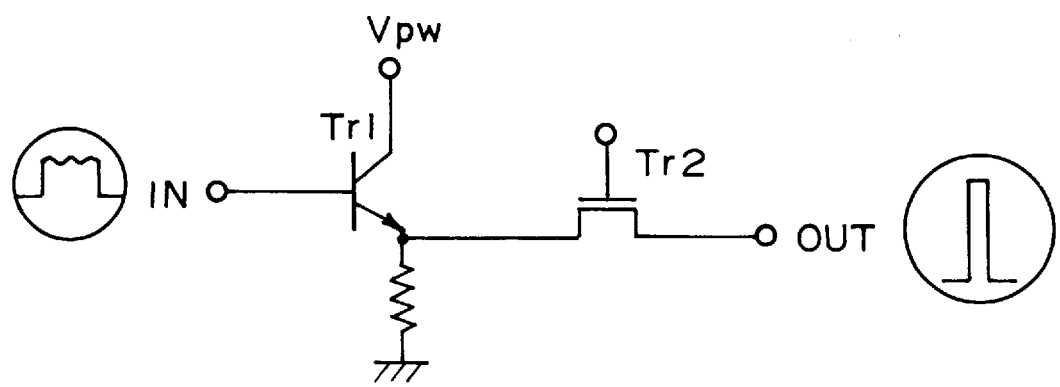
F I G. 4
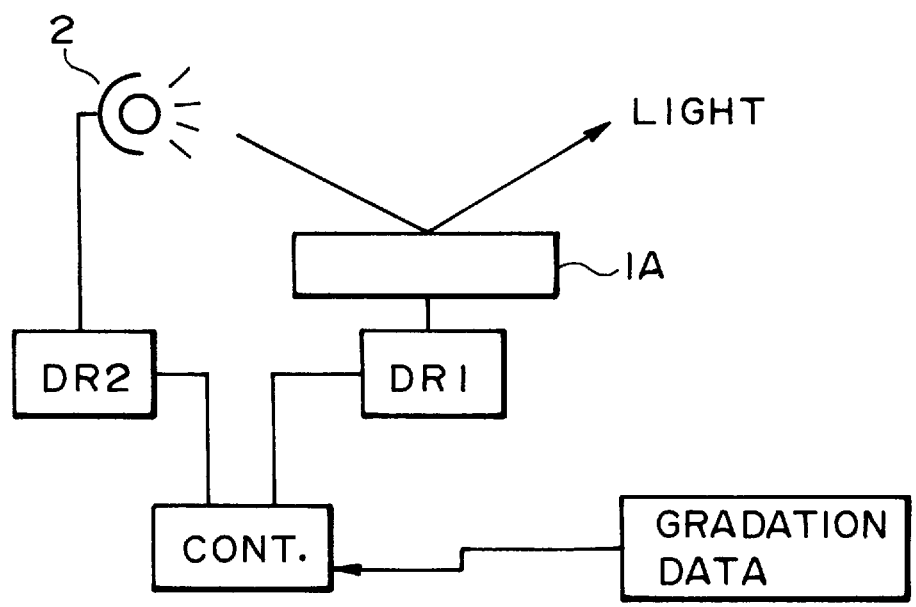
F I G. 5

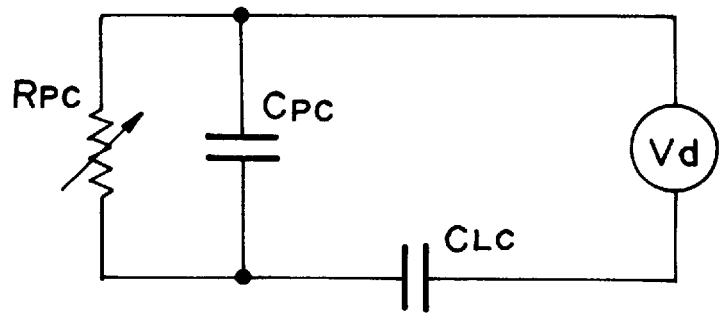
F I G. 6
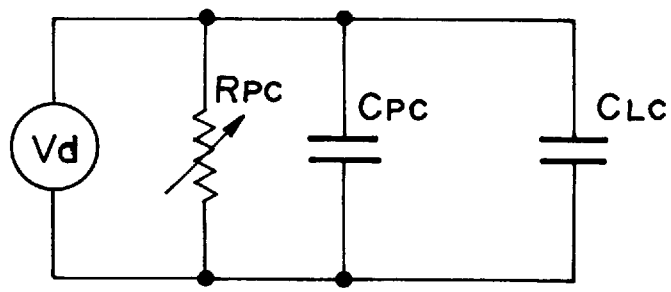
F I G. 7
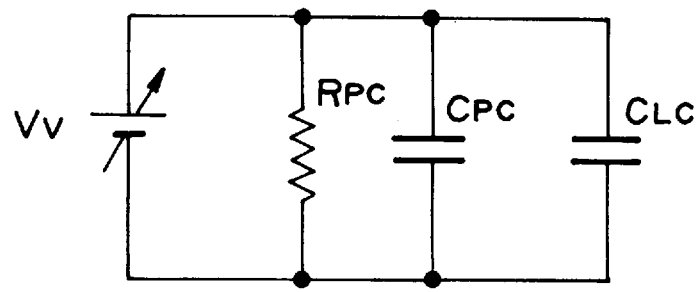
F I G. 8

F I G. 9A
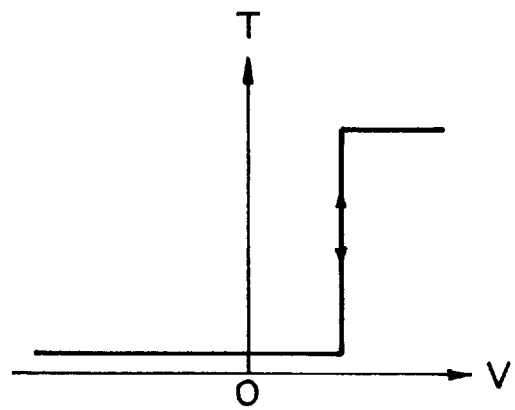
F I G. 9B
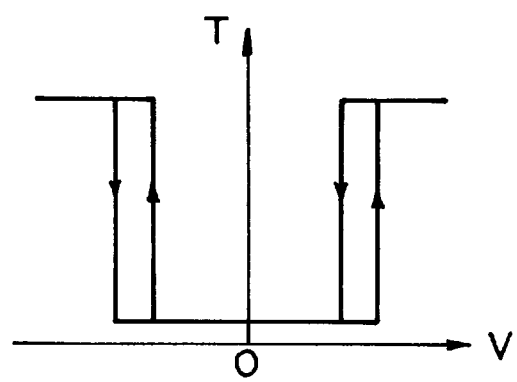
F I G. 9C
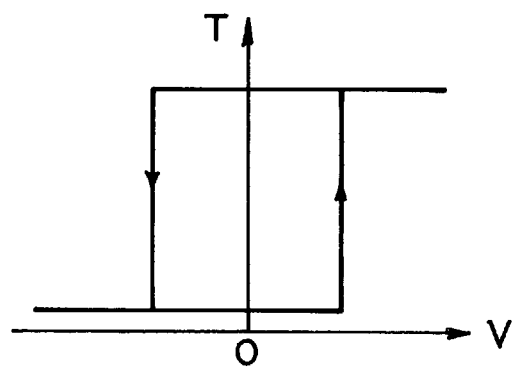
F I G. 9D
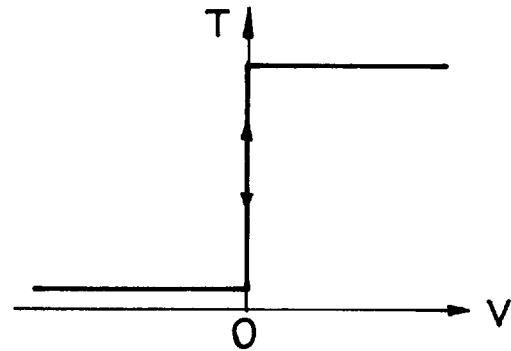

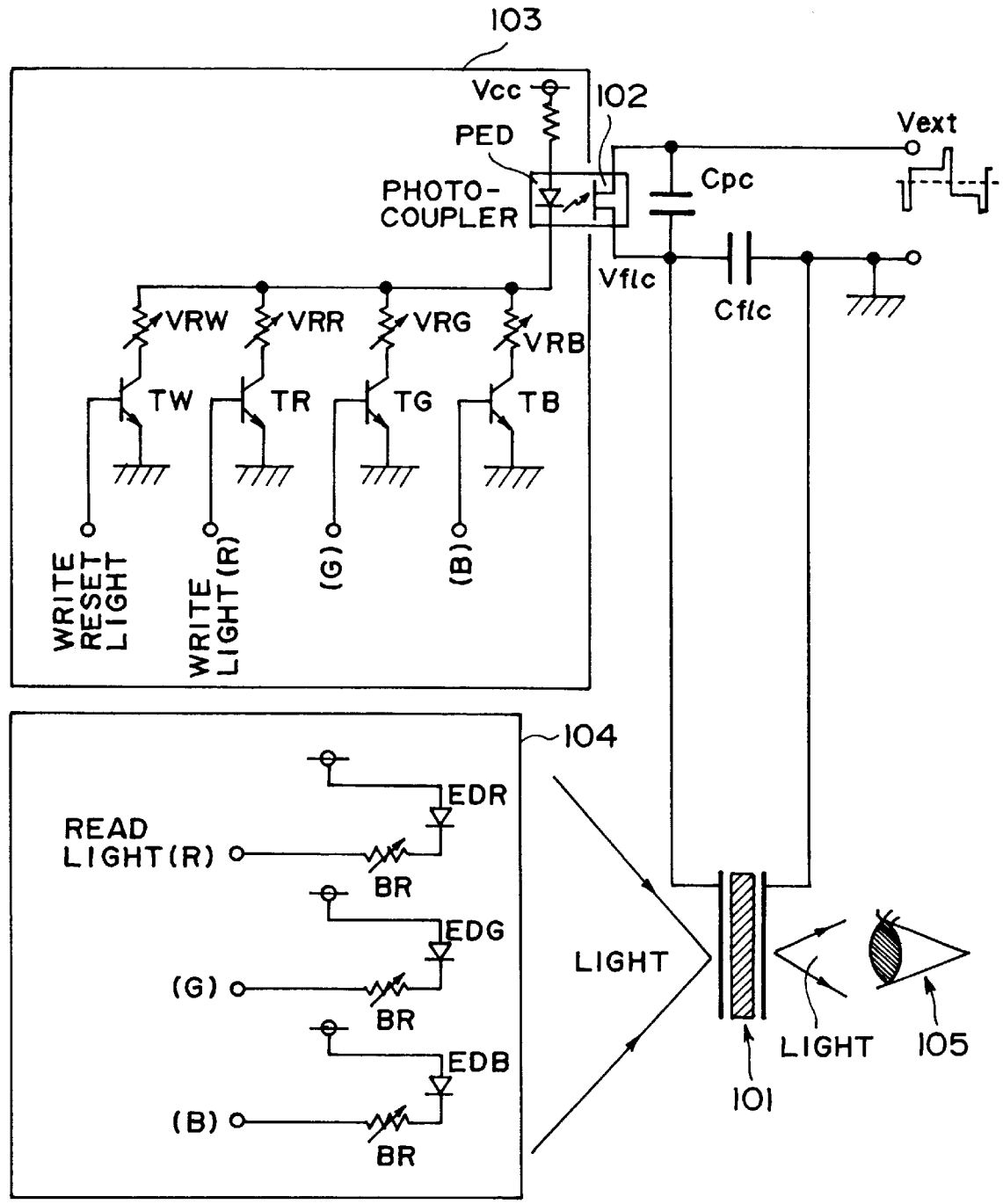
F I G. 10

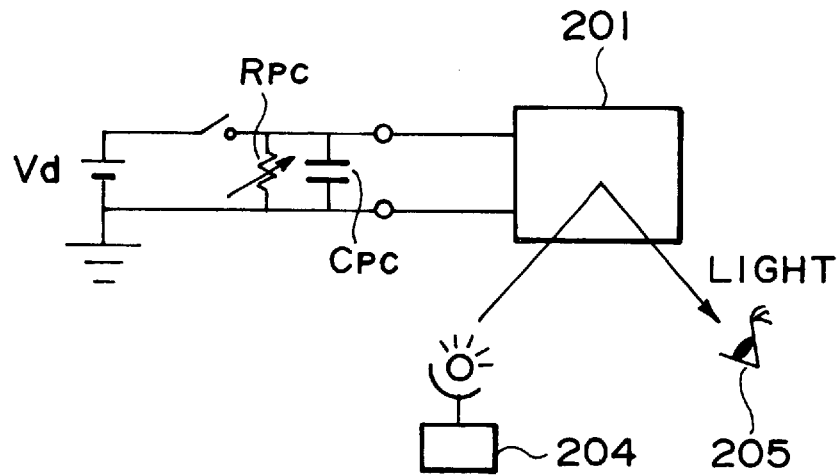
F I G. 12
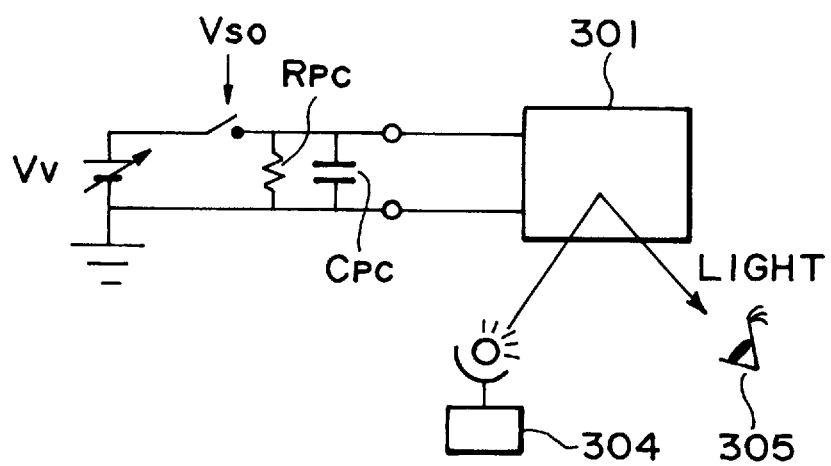
F I G. 14

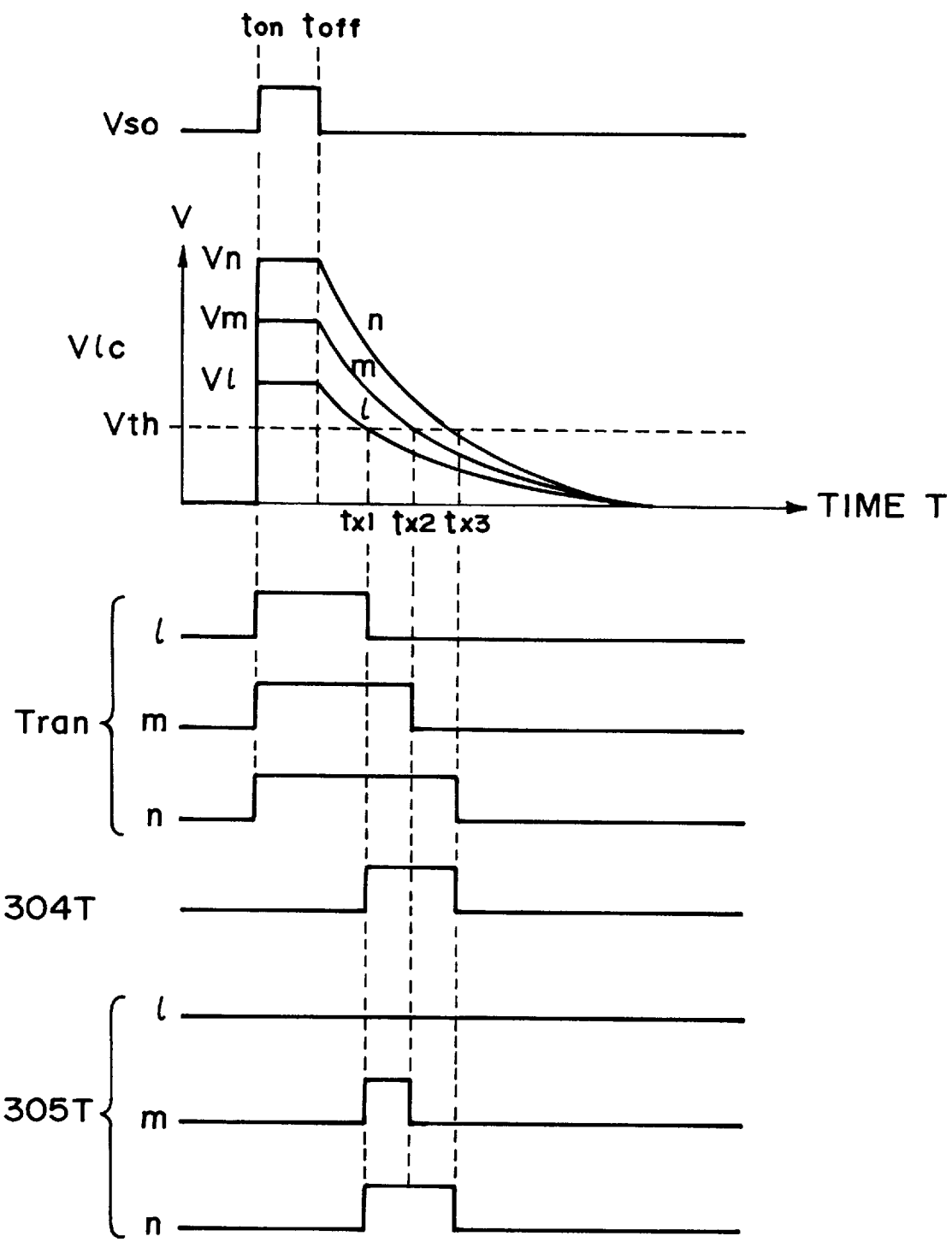
F I G. 15

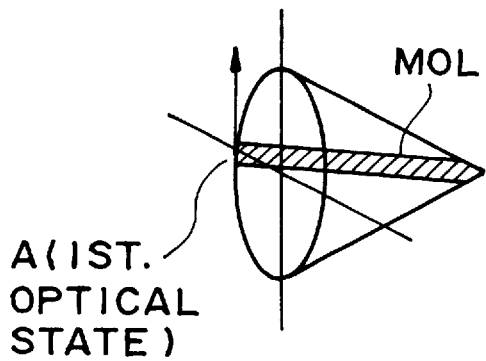
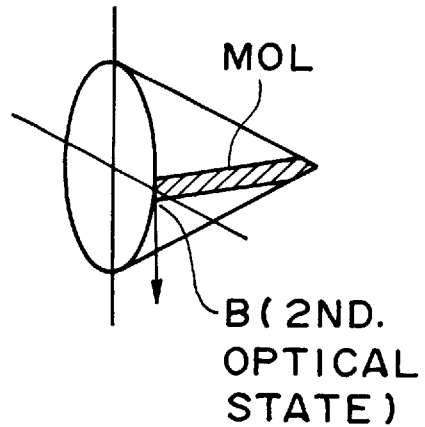
FIG. 19A  FIG. 19B
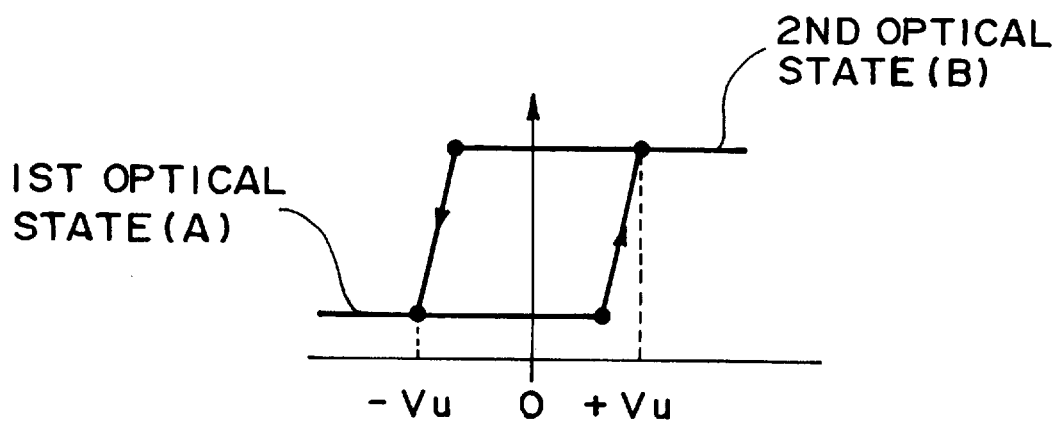
FIG. 20

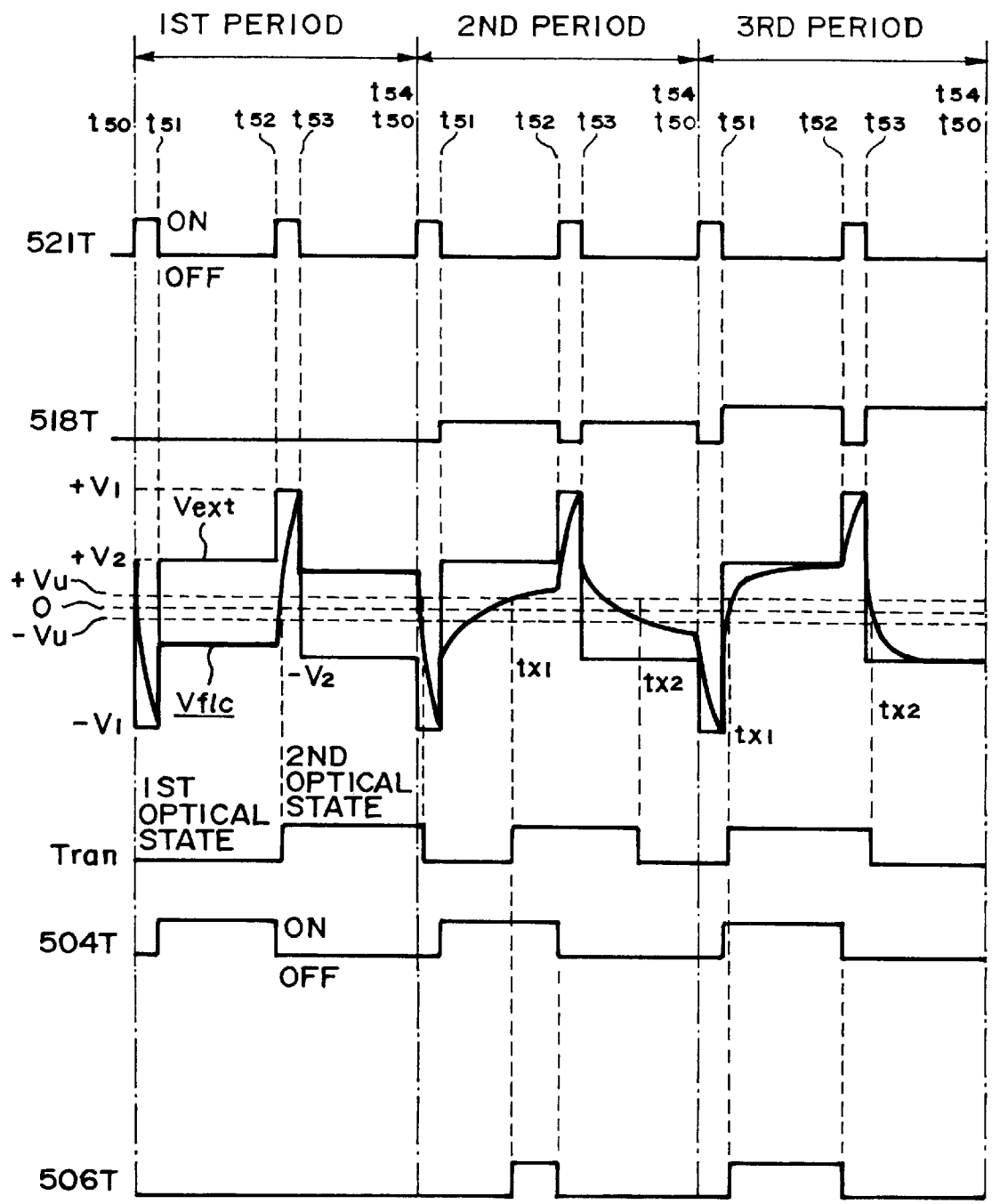
F I G. 21

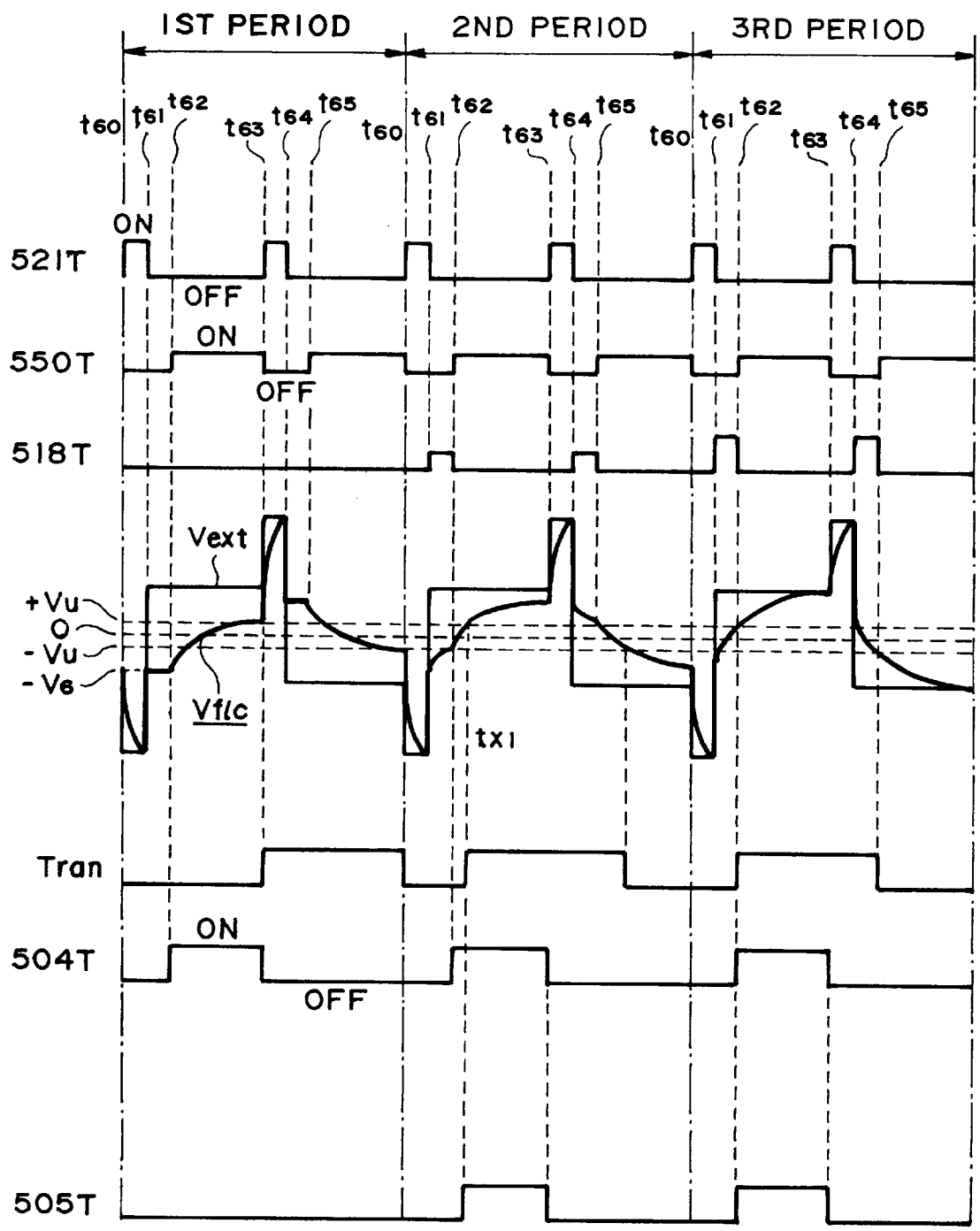
F I G. 24

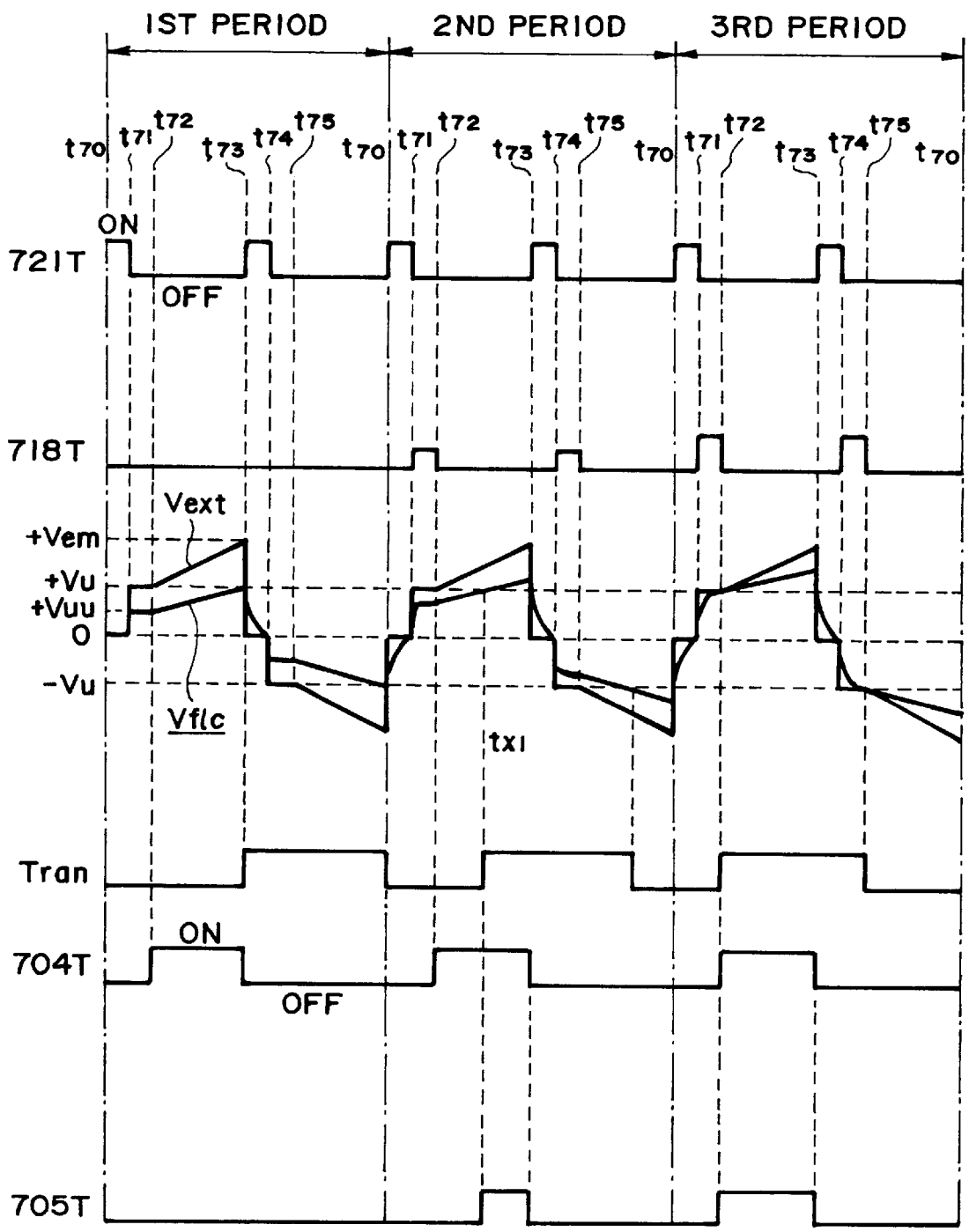
F I G. 25

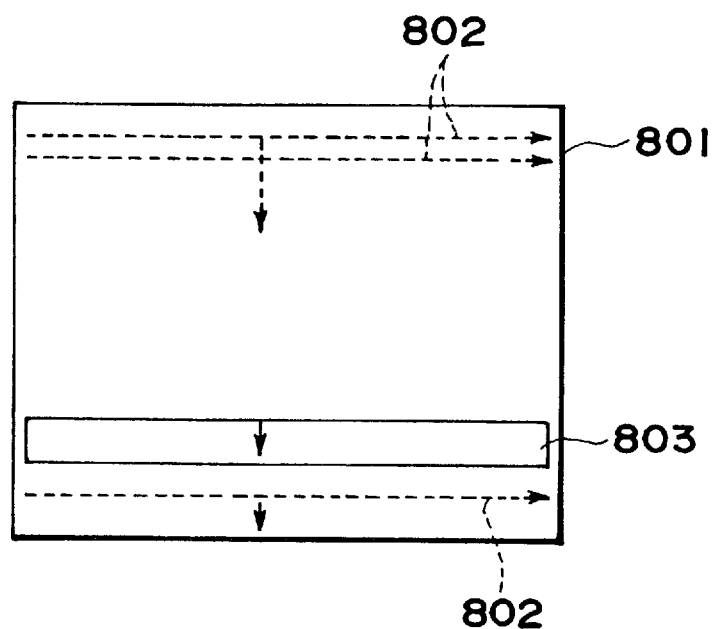
F I G. 26

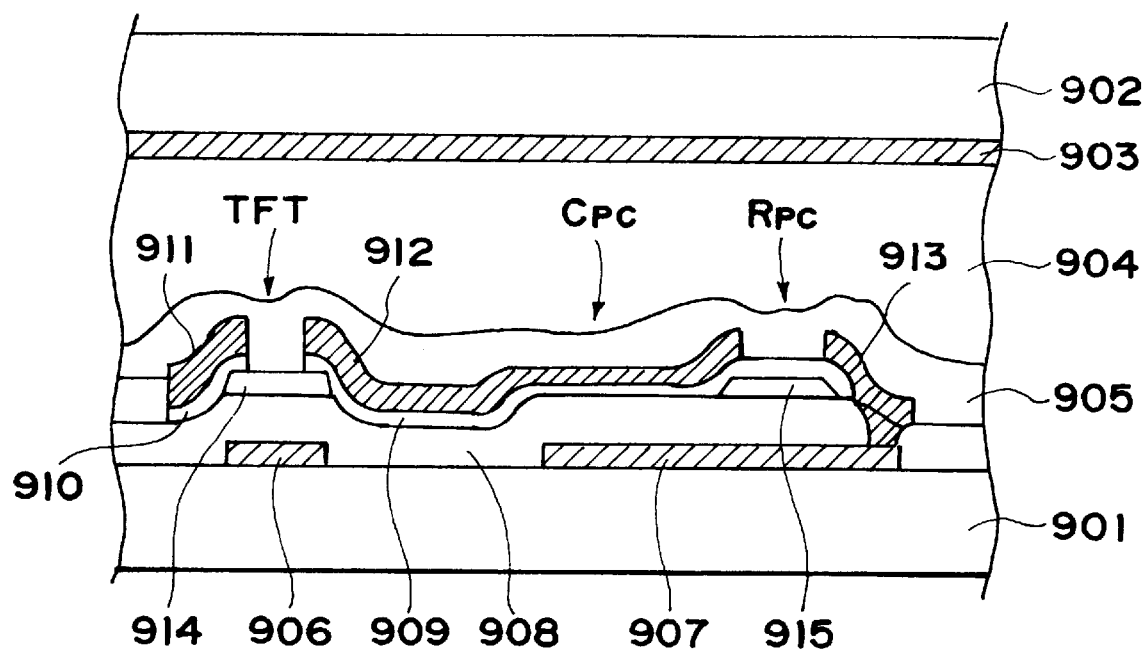
F I G. 31

DRIVING METHOD FOR DISPLAY APPARATUS

FIELD OF THE INVENTION AND RELATED ART

The present invention relates to a method for driving a display apparatus including an optical modulation or image display device of the type controlling the quantity of light issued from a light source and transmitted or reflected thereby.

An optical modulation device is included in various optical apparatus, such as a display apparatus. Gradational display or gray-scale display is performed by using such an optical modulation device, for example according to various schemes as will be described hereinbelow with reference to a liquid crystal display device as a familiar example.

According to one scheme, a twisted nematic (TN) liquid crystal is used as an optical modulation element (substance) constituting pixels and a voltage data is applied to the TN-liquid crystal to modulate (control) the transmittance through a whole pixel.

According to a second scheme, one pixel is composed as an assemblage of plural sub-pixels so that each sub-pixel is turned on or off based on binary data to modulate the area of sub-pixels placed in a light-transmission state. This scheme is disclosed, e.g., in Japanese Laid-Open Patent Application (JP-A) 56-88193, European Laid-Open Patent Application (EP-A) 453033 and EP-A 361981.

According to a third scheme, one pixel is provided with a distribution of electric field intensity or inversion threshold of liquid crystal so that a bright state portion and a dark state portion are co-present in a varying areal ratio to modulate the transmittance through the pixel. This scheme is disclosed in U.S. Pat. No. 4,796,980 issued to Kaneko, et al and entitled "Ferroelectric liquid crystal optical modulation device with regions within pixels to initiate nucleation and inversion", and U.S. Pat. Nos. 4,712,877, 4,747,671, 4,763, 994, etc.

According to a fourth scheme, the period of one pixel being turned-on to show a bright state is modulated. This scheme is disclosed in U.S. Pat. No. 4,709,995 issued to Kuribayashi, et al and entitled "Ferroelectric display panel and display method therefor to activate gray scale". Another example of digital duty modulation is disclosed in U.S. Pat. No. 5,311,206 issued to Nelson and entitled "Active row backlight column shutter LCD with one shutter transition per row".

Herein, the first scheme is referred to as brightness modulation; the second scheme, pixel division; the third scheme, domain modulation; and the fourth scheme, digital duty modulation.

The brightness modulation is not readily applicable to a device using an optical modulation substance having a steep transmittance change characteristic or a memory characteristic. Further, the brightness modulation using a TN-liquid crystal is not suitable for a system dealing with data varying at high speeds because the TN-liquid crystal generally has a low response speed.

The pixel division equivalent to a system using a unit pixel comprising an assemblage of pixels is caused to have a lower spatial frequency, thus being liable to result in a lower resolution. Further, the area of light-interrupting portion is increased to lower the aperture ratio.

The domain modulation requires a pixel of complicated structure for providing a distribution of electric field intensity or inversion threshold. Further, as the voltage margin for halftone display is narrow, the performance is liable to be affected by the temperature.

The digital duty modulation requires an ON-OFF time modulation so that the modulation unit time is limited by the clock pulse frequency and gate-switching time. Accordingly, it is difficult to effect a high-accuracy modulation and the number of displayable gradation levels is limited. Further, this scheme necessarily requires an analog-to-digital (A/D) conversion of analog data so that it cannot be readily applied to a simple optical modulation system.

SUMMARY OF THE INVENTION

In view of the above-mentioned problems, an object of the present invention is to provide an optical modulation or image display system (i.e., method and apparatus) allowing optical modulation based on analog data.

Another object of the present invention is to provide an optical modulation or image display system applicable to an optical modulation device using an optical modulation substance having a steep applied voltage-transmittance (V-T) characteristic or an optical modulation substance having a memory characteristic.

A further object of the present invention is to provide an optical modulation or image display system capable of realizing a high spatial frequency and a high resolution.

Another object of the present invention is to provide an optical modulation or image display system which allows gradational data reproduction according a relatively simple scheme based on analog duty modulation and is thus inexpensive.

According to the present invention, there is provided a driving method for a display apparatus including an optical modulation device comprising a pair of electrodes, and a photoconductor layer and an optical modulation substance layer disposed between the electrodes, a signal light source for supplying light data carrying gradation data to the photoconductor layer, and a readout light source for supplying readout light for reading out image data to the optical modulation substance layer, said driving method comprising:

scanningly supplying the light data to the photoconductor layer, and scanningly supplying the readout light to the optical modulation substance layer.

Preferably a lighting time of the readout light source is controlled to modulate an overlapping time between a period of the optical modulation substance assuming a prescribed optical state and the lighting time depending on given gradation data.

According to another aspect of the present invention, there is provided a driving method for a display apparatus including (a) an optical modulation device comprising a plurality of two-dimensionally arranged pixels, each comprising an optical modulation element formed by disposing an optical modulation substance layer between a pair of electrodes and a drive element for supplying an electric signal carrying gradation data to the optical modulation element, and (b) a readout light source for supplying readout light for reading out image data to the optical modulation substance layer, said driving method comprising:

supplying the electric signal to a scanningly selected pixel, scanning the pixels with readout light to supply the readout light to the optical modulation substance layer at the selected pixel, and controlling a lighting time of the readout light source to modulate an overlapping time between a period of the optical modulation substance assuming a prescribed optical state and the lighting time depending on given gradation data.

In the present invention, a point or period of time when a voltage applied to an optical modulation element exceeds a threshold for switching an optical state of the optical modulation element is changed in an analog mode depending on given gradation data. As a result, a length of overlapping time between the ON time of an optical modulation means, i.e., the period of opening of an optical shutter, and the lighting period of a light source, is modulated in an analog mode so that the time integration of the transmitted or reflected light quantity corresponds to the gradation data. Thus, the number of gradation levels is not restricted by a digital quantity, such as clock pulse frequency, and the A/D conversion of gradation data can be omitted.

Further, analog modulation becomes possible even by using a digital (or binary) display device having a steep applied voltage-transmittance characteristic, as an effect which cannot be expected heretofore.

Thus, good gradational display becomes possible according to the present invention.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram showing a basic arrangement of an optical modulation system according to the invention.

FIG. 2 is a graph showing an applied voltage (or pulse width)-dependent transmittance characteristic of an optical modulation element (or substance) used in the invention.

FIG. 4 is a diagram for illustrating an embodiment for generating gradation data used in the invention.

FIG. 5 is a block diagram showing another embodiment of the optical modulation system according to the invention.

FIGS. 6, 7 and 8 are respectively a diagram of an embodiment of the drive circuit for an optical modulation device used in the invention.

FIGS. 9A–9D are respectively a graph showing a transmittance-applied voltage characteristic of an optical modulation substance (or element) used in the invention.

FIG. 10 is a circuit diagram of an optical modulation apparatus.

FIGS. 12, 14 and 16 are respectively a circuit diagram for an optical modulation apparatus.

FIGS. 13, 15 and 17 are diagrams showing time-serial waveforms used for driving the optical modulation apparatus of FIGS. 12, 14 and 16, respectively.

FIGS. 19A and 19B are schematic illustrations of two molecular orientations (optical states) of a chiral smectic liquid crystal used in the device of FIG. 18.

FIG. 20 is a graph showing an electrooptical characteristic of the liquid crystal used in the device of FIG. 18.

FIG. 21 is a time chart for illustrating an operation of the device of FIG. 18.

FIGS. 23–25 are respectively a time chart for illustrating an operation of an image forming apparatus for reference.

FIG. 26 is an illustration of a manner of scanning with writing light and readout light according to an embodiment of the invention.

FIG. 31 is a schematic partial sectional view of a portion corresponding to almost one pixel of an optical modulation device used in the invention.

DESCRIPTION OF THE PREFERRED EMBODIMENTS

Some embodiments of the present invention will be described later with reference to FIGS. 26 et seq., but, in advance thereof, some description is made below regarding a basic system or principle (which per se has been already disclosed in a separate application by the present applicant) for supporting the present invention.

First of all, a basic modulation scheme adopted in the present invention will be described with reference to the drawings.

FIG. 1 is a diagram of an example of system for realizing the modulation scheme according to the present invention. The system includes an optical shutter 1 for controlling light transmission as an optical modulation means, a light source 2 for emitting light, a drive means DR1 for driving the optical shutter, a drive means DR2 for turning on and off the light source, and a control means CONT for controlling power supplies to and operation time of the two drive means.

FIG. 2 is a graph showing an example of transmittance change characteristic of an optical modulation element (substance) constituting the optical shutter 1. For example, when an applied voltage of a constant pulse width exceeds a threshold Vth, a transmittance is caused to abruptly increase to be a constant value above a saturation voltage Vsat. If the optical modulation substance has a memory characteristic, the resultant optical state is retained at constant even after removal of the applied voltage.

Figure 3:
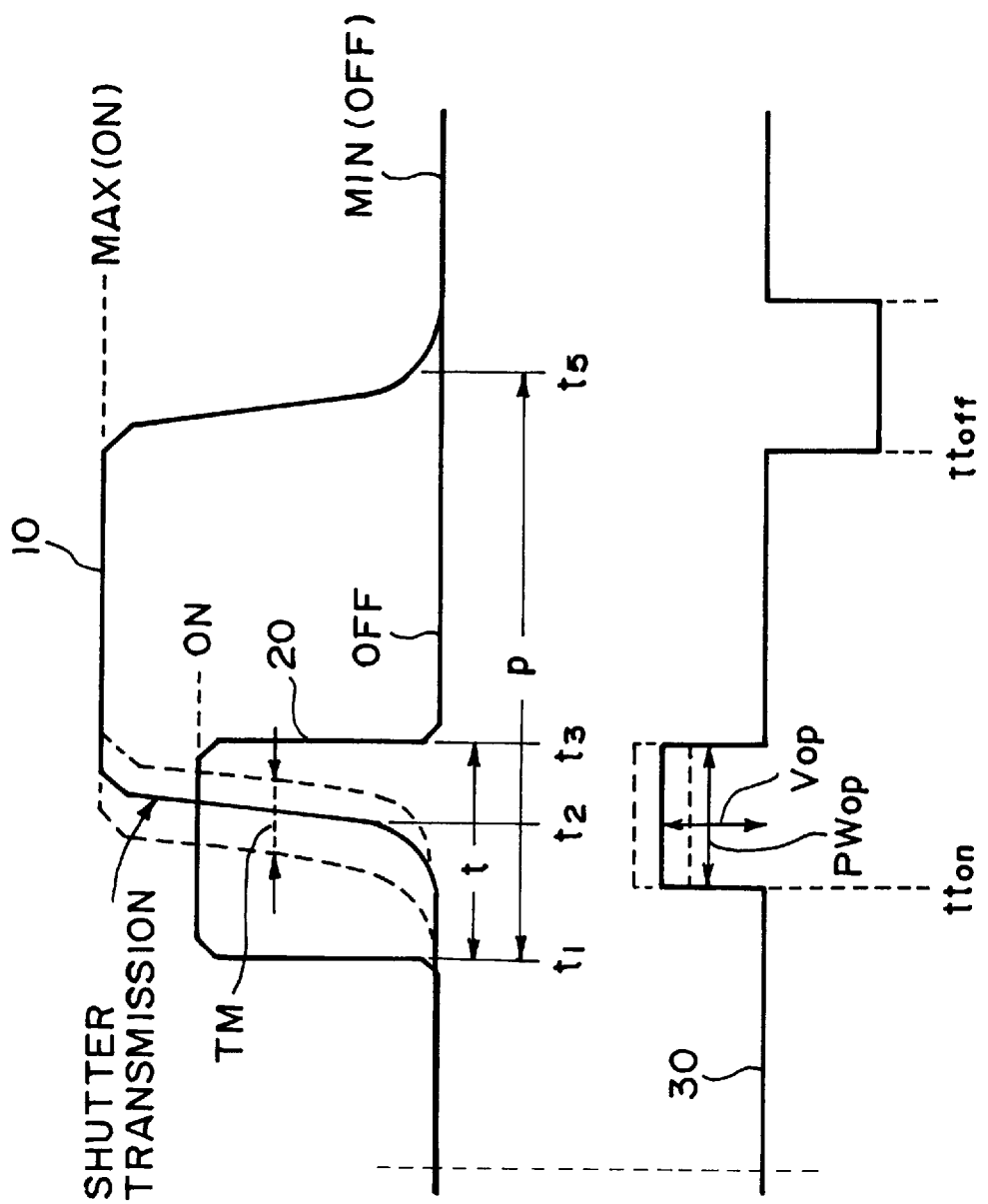
FIG. 3 is a time chart for illustrating a basic embodiment of the driving method for an optical modulation device according to the invention.

FIG. 3 is a time chart for illustrating a basic operation of the system shown in FIG. 1. Referring to FIG. 3, a curve 10 represents an optical transition of the optical shutter 1, a curve 20 represents the operation (lighting and non-lighting) of the light source 2; and a curve 30 represents a signal applied to the optical shutter, of which the amplitude (peak value) Vop (and further optionally pulse width PWop) is changed depending on given gradation data.

The light source is turned ON at time $t_1$ and turned OFF at time $t_3$, between which light is emitted from the light source for a period t, which is prescribed for providing a recognizable halftone. In parallel with a periodical operation (lighting) of the light source, the optical modulation substance is supplied with an applied voltage to switch from a dark state (Min) to a bright state Max when the time integration of the applied voltage exceeds a threshold.

A rise time $t_2$ of the switching depends on the amplitude Vop and pulse width PWop. As at least one of the amplitude Vop and the pulse width PWop is modulated depending on gradation data, the time $t_2$ is changed within a time range TM depending on the gradation data. Time $t_{off}$ is a time for applying a signal for turning off the optical shutter, and the time integration of light quantity transmitted through the optical shutter 1 is governed by a time of overlapping between the lighting time (period) and a period in which the optical shutter is held in an ON state, so that the overlapping time (period) is changed (modulated) depending on the gradation data. As a result, the time integration of the transmitted light quantity may be easily modulated if, for example, the amplitude Vop is changed in an analog manner at a constant pulse width PWop.

In any of the conventional digital duty modulation scheme, the application time $t_{on}$ of a voltage signal 30 is changed in a digital manner at constant pulse width PWop and amplitude PWop of the voltage signal 30.

In contrast, a novel feature of the present invention is that the signal 30 is treated as an analog quantity having varying amplitude (or/and pulse width) so as to allow an analog duty modulation.

FIG. 4 shows an example of circuit generating an analog signal 30. Given gradation data is amplified by an amplifier Tr1 and sampled by a switch Tr2 to provide a signal having a modulated amplitude and a prescribed pulse width required for driving the optical shutter. In the example shown in FIG. 4, the amplifier Tr1 is constituted by a bipolar transistor and the switch Tr2 is constituted by a MOSFET, but the amplifier Tr1 and the switch Tr2 need not be restricted to such simple devices.

Then, another basic modulation scheme will be described with reference to FIG. 5.

The system shown in FIG. 5 is different from the one shown in FIG. 1 in that it includes a light reflection means 1A as an optical modulation means instead of the light transmission means 1 in FIG. 1. The light reflection means may comprise a liquid crystal device or a mirror device. Such a reflective-mode liquid crystal device may be constituted by forming one of a pair of substrates sandwiching a liquid crystal with a transparent member and the other with a reflective member so as to select a light-absorbing state or a light-reflecting state depending on an orientation state (optical state) of the liquid crystal. In the case of a mirror device, the reflection surface angle of the mirror may be controlled by moving the mirror to select a prescribed direction (ON state) suitable for reflection and another direction not causing reflection.

Then, the overlapping time between the lighting time of the light source 2 and the ON period of the reflection means 1A is modulated in an analog manner depending on given gradation data.

Herein, the ON period of the reflection means generally refers to a period in which the light source device is in a light-reflecting state or the mirror device has a reflecting surface directed in a prescribed direction. Alternatively, the ON period may be regarded as referring to a period where the reflection means assumes a non-reflecting state, e.g., a light-interrupting state. In this case, the resultant states are simply inverted.

(Drive Circuit)

Some description will be made regarding a drive circuit used in the present invention.

FIG. 6 illustrates a drive circuit for an optical modulation means denoted by $C_{LC}$.

It is first assumed that a voltage sufficient to exceed a threshold of the optical modulation means $C_{LC}$ is applied while changing a resistance $R_{PC}$ corresponding to given gradation data. If the $R_{PC}$ is high, the time at which a voltage applied to $C_{LC}$ exceeds the threshold is delayed. On the other hand, if $R_{PC}$ is low, the time at which the voltage applied to $C_{LC}$ exceeds the threshold comes early. Accordingly, by adjusting the time of threshold exceeding and the point and period of lighting of the light source, the analog duty modulation of transmitted light or reflected light becomes possible.

FIG. 7 shows another drive circuit which is different from the one shown in FIG. 6 only in that the optical modulation means $C_{LC}$ is connected in parallel with a resistance $R_{PC}$ and a capacitance $C_{PC}$. In this case, a sufficient voltage Vd is applied for a prescribed period to place the $C_{LC}$ in the ON state, and then a discharge phenomenon depending on the time constant of the RC circuit is utilized. At a higher $R_{PC}$ causing a slower discharge, the time at which the voltage applied to $C_{LC}$ subslides below the threshold is delayed. On the other hand, at a lower $R_{PC}$ causing a faster discharge, the time at which the voltage applied to $C_{LC}$ subsides below the threshold comes earlier. By setting the time within the lighting period of the light source, the light transmission or reflectance period can be modulated in an analog manner depending on a difference in the time.

FIG. 8 shows another drive circuit example wherein gradation data is represented by a variable voltage $V_V$. Different from the one shown in FIG. 7, the time constant of an RC circuit including $R_{PC}$ and $C_{PC}$ is fixed, so that the time at which the voltage applied to $C_{LC}$ subsides below the threshold is determined by the voltage $V_V$ corresponding to gradation data. Accordingly, if the time is adjusted with the lighting period, an analog duty modulation becomes possible similarly as in the example of FIG. 7.

(Light Source)

Some description is made regarding a light source. Light emitted from the light source may be any of natural sunlight, white light, monochromatic light, such as red, green and blue lights, and combinations of these, and may be determined according to appropriate selection. Accordingly, examples of the light source suitably used in the present invention may include laser light sources, fluorescent lamps, xenon lamp, halogen lamp, light-emitting diode, and electroluminescence device. These light sources may be turned on and off in a controlled manner in synchronism with drive time of the optical modulation means. Particularly, a continuous lighting time of the light source may desirably be at most a reciprocal (e.g., 1/60 sec.) of a flickering frequency which provides a flicker noticeable by human eyes. In the case of color display, it is desired to energize the R, G and B light sources according to different time sequences so as to effect optical modulation of R, G and B according to time division. On the other hand, it is also possible to use a white light source in combination with color filters so as to use different colors of filters in time division to change the light (wavelength region) of the illuminating light.

(Optical modulation device)

The optical modulation device used in the present invention may include a light-transmission-type device called an optical shutter (or light valve) and a reflection device as a light reflection means for modulating light reflectance. A representative example thereof may include one called a spatial light modulator (SLM).

The optical shutter used in the present invention may be one capable of providing optically different two states. A preferred example thereof may be a liquid crystal device using a liquid crystal as an optical modulation substance.

A preferred type of liquid crystal device my be one comprising a liquid crystal disposed between a pair of electrodes so that liquid crystal molecules change their orientation states depending on an electric field applied thereto, and a light transmittance therethrough is controlled depending on the orientation state in combination with a polarizing device. Accordingly, optical factors, such as transmittance, reflectance, transmission state and reflection states, of a liquid crystal device are determined in combination with a polarizing device.

More specifically, it is possible to use a liquid crystal cell (or panel) comprising a pair of substrates between which a liquid crystal is sealed up. At least one of the mutually opposing inner surfaces of the substrates may be provided with a transparent electrode and an alignment film.

The substrates may comprise a transparent sheet of glass, plastic, quartz, etc. In case of constituting a device used as a reflection means, one substrate can be non-light-transmissive. The transparent electrode may preferably comprise a metal oxide conductor, such as tin oxide, indium oxide or ITO (indium tin oxide).

The alignment film may preferably comprise a polymer film subjected to a uniaxial aligning treatment, such as rubbing, or an inorganic film formed by oblique vapor deposition.

The liquid crystal may suitably comprise a nematic liquid crystal operating in a nematic phase or a smectic liquid crystal operating in a smectic phase.

The reflection device used in the present invention may be a device called DMD (digital micromirror device) wherein a reflecting surface of a reflective metal is moved by an electrostatic force caused by an applied voltage so as to change the angle of the reflecting surface to modulate the emission direction of the reflected light, or a liquid crystal device of a reflection type including a liquid crystal cell (or panel) as described above, of which one surface is made reflective and the other surface is transmissive so that liaht incident thereto is reflected when the liquid crystal is placed in a light-transmissive state.

FIGS. 9A–9D show several transmittance-applied voltage characteristics of optical modulation elements (substances) usable in the present invention. In the case of the DMD, the ordinates may be regarded as representing a light quantity reflected in a prescribed direction.

FIG. 9A shows a characteristic of an optical modulation substance causing a transition (switching) of optical states when a positive threshold voltage is exceeded. FIG. 9B shows a characteristic of an optical modulation substance having positive and negative thresholds each accompanied with a hysteresis. FIG. 9C shows a characteristic of an optical modulation substance showing a hysteresis providing positive and negative thresholds. FIG. 9D shows a characteristic exhibiting a threshold at a voltage of zero. FIGS. 9A–9D show characteristics in a somewhat simplified and ideal form, and a vertical line shown in these figures is actually inclined to provide a threshold value and a saturation value on both sides as shown in FIG. 2.

In respect of matching with drive circuits, the characteristic of FIG. 9A or 9B may preferably be combined with a parallel circuit shown in FIG. 7 or 8, and the characteristic of FIG. 9C or 9D may preferably be combined with a series circuit as shown in FIG. 6.

The following Examples 1 to 5 are raised as reference examples for facilitating the understanding of the present invention.

(Example 1)

FIG. 10 illustrates an optical modulation system for driving an optical modulation device. The system includes a liquid crystal device 101 comprising a pair of substrate each having thereon an electrode and a chiral smectic liquid crystal disposed between the substrates, and a gradation data-generating circuit 103 for generating gradation data, a light source 105. In front of the system, an observer 105 is indicated. The system also includes a drive circuit including a capacitive element $C_{PC}$ and a transistor 102, of which the source-drain (or emitter-collector) resistance is changed by changing the gate or base potential of the transistor 102, thereby changing a time point at which the voltage exceeds the inversion threshold of the liquid crystal. The drive circuit includes a voltage application means $V_{ext}$ for applying a reset voltage and drive voltages to the liquid crystal device. $C_{flc}$ represents a capacitance of the liquid crystal.

The gradation data-generating circuit 103 includes a light-emitting diode PED. four variable resistances VRB, VRG, VRR and VRW, four switching transistors TB, TG, TR and TW, and a power supply VCC. The diode PED and the transistor 102 constitutes a photocoupler.

Electric signals in the form of variable resistance values constituting gradation data for respective colors are converted into light data by the light-emitting diode PED.

The light source 104 includes light-emitting diodes EDR, EDG and EDB for emitting light in three colors of R, G and B, and variable resistances BR optionally used for taking white balance.

Figure 11:
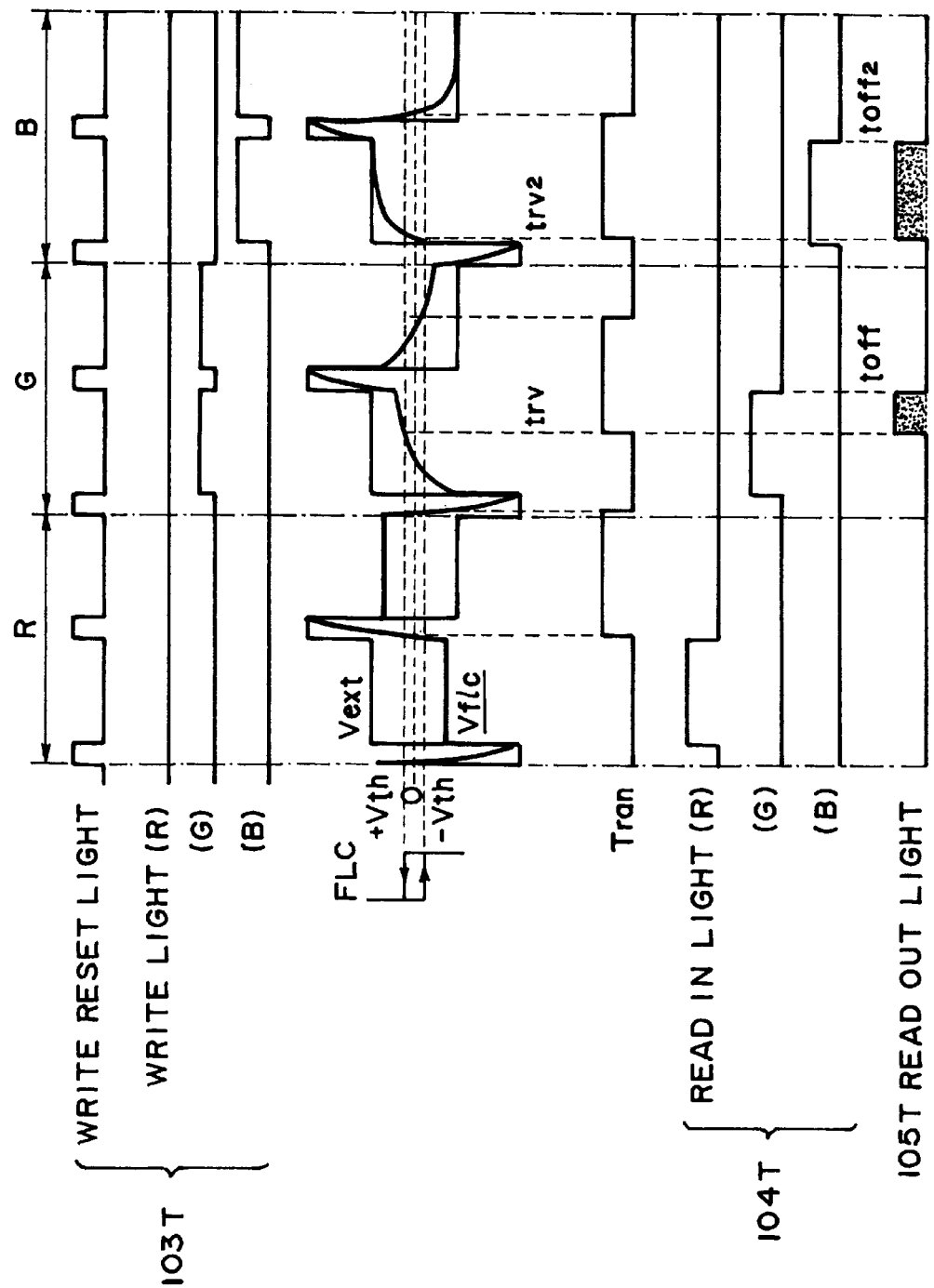
FIG. 11 is a time-serial waveform diagram for illustrating a manner of driving the optical modulation apparatus.

FIG. 11 is a time chart for operation of the system of FIG. 10. At 103T are shown time points for outputting light data. A curve $V_{flc}$ at FLC represents a voltage applied to the liquid crystal and a curve $V_{ext}$ represents a voltage applied from an external voltage supply $V_{ext}$. At $T_{ran}$ is shown a transmittance level through the liquid crystal device. At 104T are shown output levels of light sources. At 105T is a transmitted light quantity level recognized by the observer 105.

Referring to FIG. 11, first, white light for resetting is supplied, and a reset pulse is applied from the voltage application means $V_{ext}$, whereby the liquid crystal is once reset into a dark state.

Then, when light corresponding to R-gradation data is outputted, simultaneously, the R-light emitting diode EDR is turned on and $V_{ext}$ supplies a reverse-polarity voltage to the liquid crystal device. In this period, the R-light quantity from PED is very small, so that the effective voltage applied to the liquid crystal does not exceed the threshold Vth, and the liquid crystal device does not transmit the R-light from EDR.

Then, when white light is supplied again, $V_{ext}$ (a voltage supplied from the means $V_{ext}$) is increased to invert the liquid crystal into a light-transmission state. At this time, however, no light source 104 is energized, so that the observer continually recognizes the dark state.

Then $V_{ext}$ is changed into a negative voltage but the effective voltage applied to the liquid crystal does not exceed the threshold of −Vth, so that the liquid crystal device remains in the bright state. However, also in this period, no light source is energized.

R display period is terminated in the above-described manner (in the embodiment of FIG. 11).

Then, an operation in G-display period is performed similarly as in R-display period. G data light quantity is larger than in the case of R described above, so that the voltage applied to the liquid crystal exceeds the threshold Vth at time trv. Then, during a period until time $t_{off}$ when the G light source EDG is turned off, the liquid crystal device transmits the G-light, so that the observer recognizes a medium level of G-light.

Then, an operation in B-display period is performed similarly as in the R and G display periods. B data light quantity is further larger than in the case of G described above, so that the voltage applied to the liquid crystal exceeds the threshold Vth at time trv2. Then, during a period until time $t_{off}$ when the B light source EDB is turned off, the liquid crystal device transmits the B-light, so that the observer recognizes a medium level but close to a maximum level of B-light.

As described above, in this embodiment, the time (point and period) of $V_{flc}$ exceeding the threshold Vth is changed depending on gradation data. Further, the time of turning off a light source is determined so that the lighting period of the light source does not overlap with the transmission period (ON period) of the liquid crystal device corresponding to gradation data giving a minimum level of transmittance.

As a result, in this embodiment, it is possible to obtain a desired halftone level between a minimum level and a maximum level of brightness. Further, as the voltage applied to the liquid crystal is symmetrically balanced in positive and negative polarities, only a DC component of substantially zero is applied to the liquid crystal to suppress the deterioration of the liquid crystal device.

(Example 2)

FIG. 12 illustrates another embodiment of optical modulation system. The system includes a reflection-type liquid crystal device 201 comprising a pair of substrates each having thereon an electrode and a liquid crystal disposed between the substrates, a light source-drive circuit 204 for driving a light source, a capacitive element $C_{PC}$, a resistive element $R_{PC}$, and a drive voltage supply Vd. In this system, a circuit is constituted so that the resistive element $R_{PC}$ is caused to have a resistance value varying depending on inputted gradation data.

The liquid crystal used may have a transmittance-applied voltage (T-V) characteristic as shown in FIG. 9A.

Figure 13:
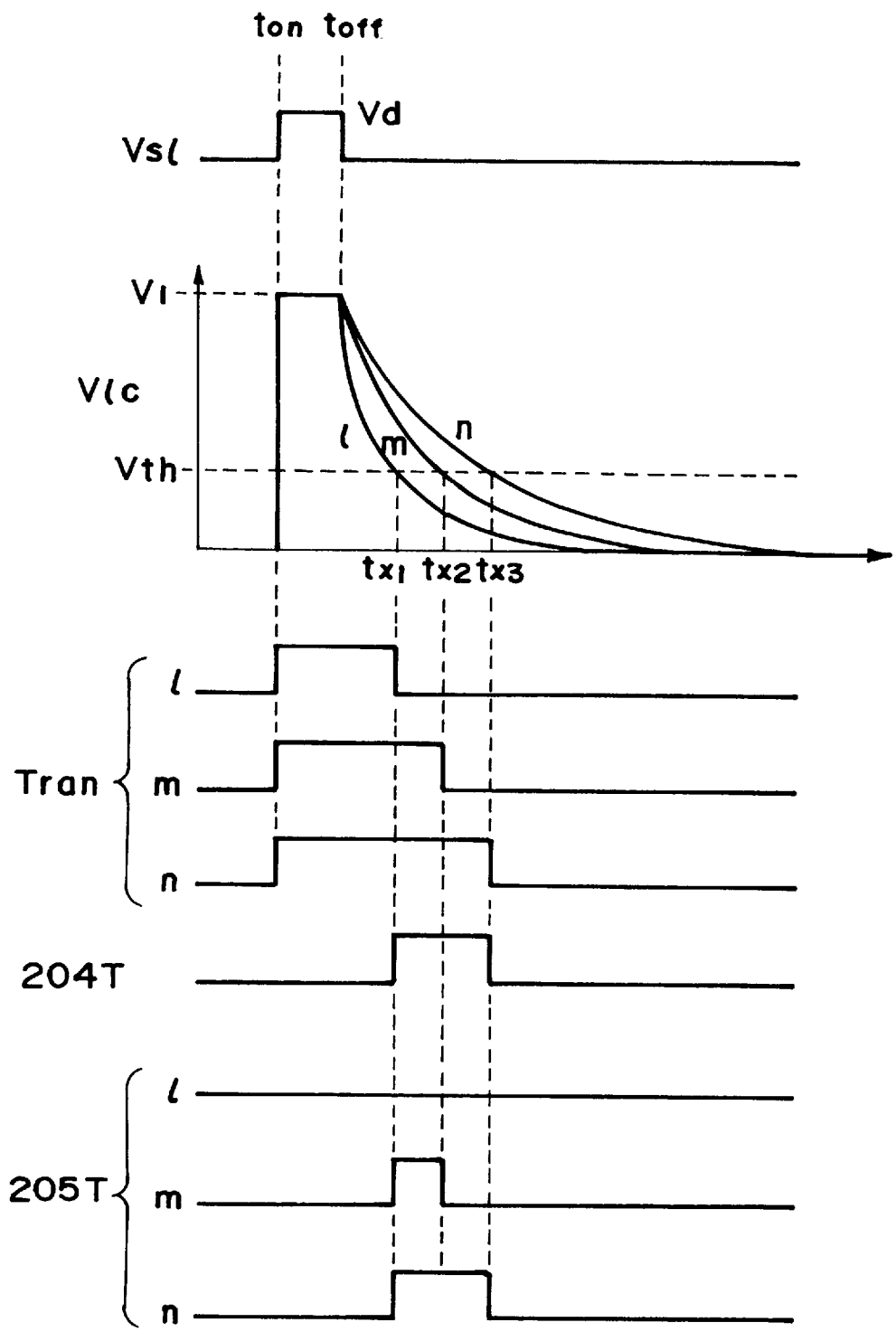

FIG. 13 is a time chart for driving the system of FIG. 12. $V_{S1}$ represents an application time of voltage Vd, $V_{lc}$ represents a voltage applied to the liquid crystal, $T_{ran}$ represents a reflectance of the liquid crystal device, 204T represents a lighting time of the light source, and 205T represents reflected light quantities recognized by the observer including a curve 1 given by a low value of $R_{PC}$, a curve m given by a medium value of $R_{PC}$ and a curve n given by a high value of $R_{PC}$, respectively corresponding to levels of analog gradation data.

Referring to FIG. 13, at time $t_{on}$, Vd is applied to the liquid crystal device and the voltage $V_{lc}$ applied to the liquid crystal assumes V1 sufficiently exceeding a threshold Vth, so that the liquid crystal device exhibits a maximum reflectance.

At time $t_{off}$, the voltage Vd is removed, whereby the voltage $V_{lc}$ applied to the liquid crystal is gradually lowered depending on the value of resistance $R_{PC}$ to subside below the threshold Vth at some time which depends on the gradation data, i.e., time $t_{x1}$ for l, $t_{x2}$ for m and $t_{x3}$ for n, when the transmittance Tran respectively assumes the lowest level respectively. In this embodiment, the light source is designed to be turned on at time $t_{x1}$ and turned off at time $t_{x3}$ as shown at 204T, so that the reflected light quantity 205T assumes the levels as represented by curves l, m and n for the cases of l, m and n, respectively, of $V_{lc}$. By setting the lighting time in this manner, an excellent linearity of halftone display is given.

As described above, in this example, the time of $V_{lc}$ subsiding below the threshold is changed depending on gradation data. Further, the time of turning on a light source is determined so that the lighting period of the light source does not overlap with the reflection period (ON period) of the liquid crystal device corresponding to the gradation data giving a minimum level of reflectance.

As a result, in this example, it is possible to obtain a desired medium reflection state between the minimum brightness level l and the maximum brightness level n.

(Example 3)

FIG. 14 illustrates another example of optical modulation system. The system includes a reflection-type liquid crystal device 301 comprising a pair of substrates each having thereon an electrode and a liquid crystal disposed between the substrates, a light source-drive circuit 304 for driving a light source, a capacitive element $C_{PC}$, a resistive element $R_{PC}$, a drive voltage supply Vv and a switch $V_{SO}$ for turning on and off the supply of a voltage signal from the drive voltage supply Vv. In this system, the voltage signal supplied from the drive voltage supply Vv carries analog gradation data.

The liquid crystal used may have a transmittance-applied voltage (T-V) characteristic as shown in FIG. 9A.

FIG. 15 is a time chart for driving the system of FIG. 14. $V_{SO}$ represents an application time of gradation signal, $V_{lc}$ represents a voltage applied to the liquid crystal, $T_{ran}$ represents a reflectance of the liquid crystal device, 304T represents a lighting time of the light source, and 305T represents reflected light quantities recognized by the observer including a curve l given by a low voltage Vl, a curve m given by a medium voltage Vm and a curve n given by a high voltage Vn, respectively corresponding to levels of the gradation signals.

Referring to FIG. 15, at time $t_{on}$, Vv is applied to the liquid crystal device and the voltage $V_{lc}$ applied to the liquid crystal assumes voltages Vl, Vm and Vn each sufficiently exceeding a threshold Vth. so that the liquid crystal device exhibits a maximum reflectance in any case.

At time $t_{off}$, the voltage Vv is removed, whereby the voltage $V_{lc}$ applied to the liquid crystal is gradually lowered corresponding to the voltage Vv to subside below the threshold Vth at some time which depends on the gradation data, i.e., time $t_{x1}$ for l, $t_{x2}$ for m and $t_{x3}$ for n, when the transmittance Tran assumes the lowest level respectively. In this embodiment, the light source is designed to be turned on at time $t_{x1}$ and turned off at time $t_{x3}$ as shown at 304T, so that the reflected light quantity 305T assumes the levels as represented by curves l, m and n for the cases of l, m and n, respectively, of $V_{lc}$.

As described above, in this example, the time of $V_{lc}$ subsiding below the threshold is changed depending on gradation data. Further, the time of turning on a light source is determined so that the lighting period of the light source does not overlap with the reflection period (ON period) of the liauid crystal device corresponding to the gradation data giving a minimum level of reflectance.

As a result, in this example, it is possible to obtain a desired medium reflection state between the minimum brightness level l and the maximum brightness level n.

(Example 4)

Figure 16:
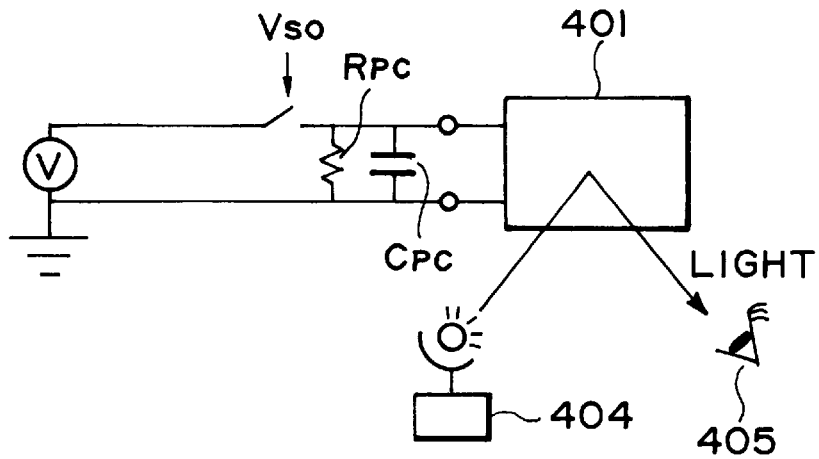

FIG. 16 illustrates another example of optical modulation system. The system includes a reflection-type liquid crystal device 401 comprising a pair of substrates each having thereon an electrode and an anti-ferroelectric chiral smectic liquid crystal disposed between the substrates, a light source-drive circuit 404 for driving a light source, a capacitive element $C_{PC}$, a resistive element $R_{PC}$, a drive voltage supply Vv, and a switch $V_{SO}$ for turning on and off the supply of a voltage signal from the drive voltage supply Vv. In this system, the voltage signal supplied from the drive voltage supply Vv carries analog gradation data. In front of the liquid crystal device 401, an observer 405 is indicated.

The chiral smectic liquid crystal used may have a transmittance-applied voltage (T-V) characteristic as shown in FIG. 9B.

Figure 17:
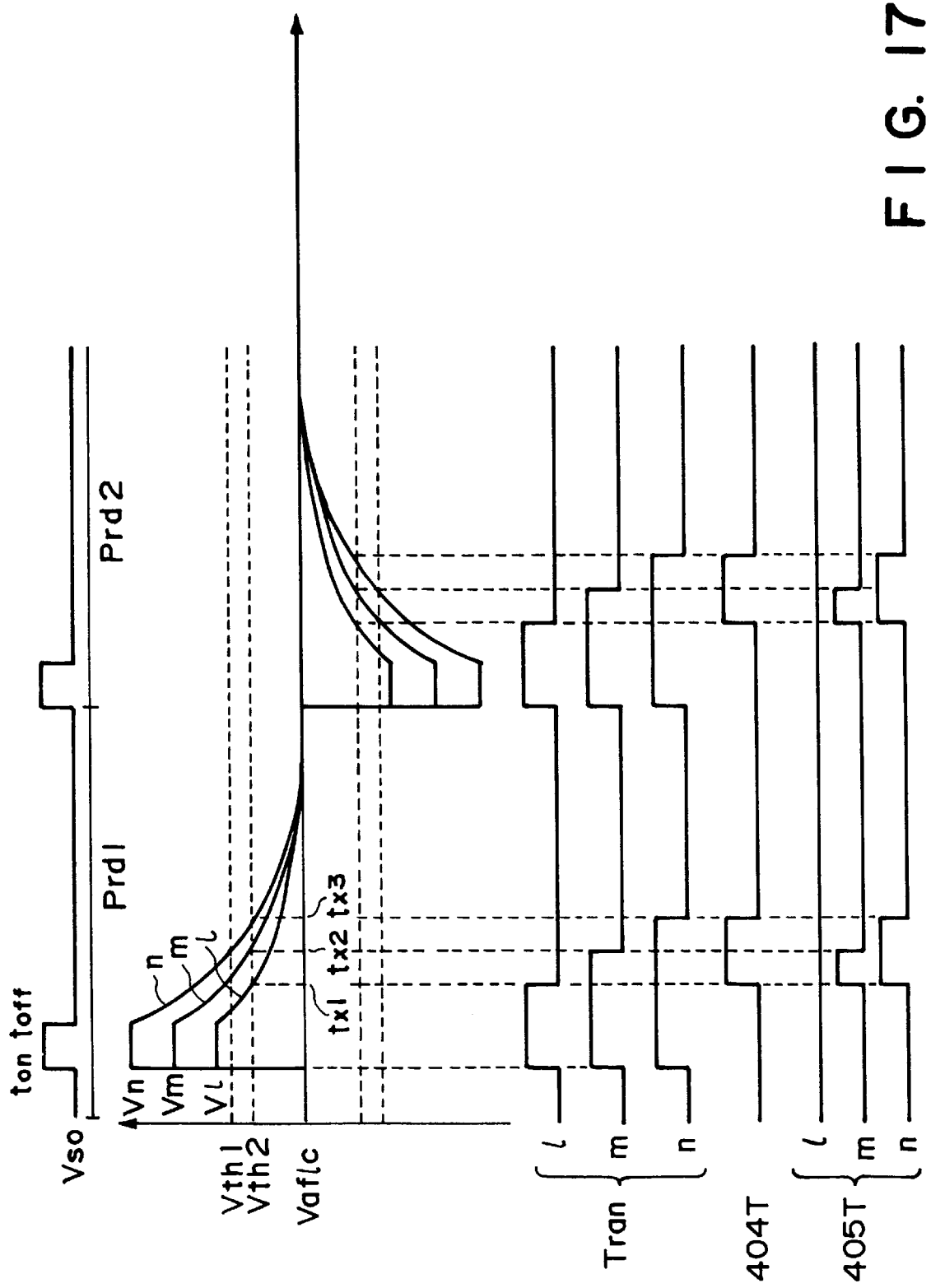

FIG. 17 is a time chart for driving the system of FIG. 16. $V_{SO}$ represents an application time of gradation signal, $V_{aflc}$ represents a voltage applied to the liquid crystal, $T_{ran}$ represents a reflectance of the liquid crystal device, 404T represents a lighting time of the light source, and 405T represents reflected light quantities recognized by the observer including a curve l given by a low voltage of Vl, a curve m given by a medium voltage Vm and a curve n given by a high voltage Vn, respectively corresponding to levels of the gradation signals.

Referring to FIG. 17, at time $t_{on}$, Vd is applied to the liquid crystal device and the voltage $V_{aflc}$ applied to the liquid crystal assumes Vl, Vm or Vn each sufficiently exceeding a threshold Vth, so that the liquid crystal device exhibits a maximum reflectance in case case.

At time $t_{off}$, the voltage Vv is removed, whereby the voltage $V_{aflc}$ applied to the liquid crystal is gradually lowered corresponding to the voltage Vv to subside below the threshold Vth at some time which depends on the gradation data, i.e., time $t_{x1}$ for l, $t_{x2}$ for m and $t_{x3}$ for n, when the transmittance Tran assumes the lowest level respectively. In this embodiment, the light source is designed to be turned on at time $t_{x1}$ and turned off at time $t_{x3}$ as shown at 404T, so that the reflected light quantity 405T assumes the levels as represented by curves l, m and n for the cases of l, m and n, respectively, of $V_{aflc}$.

It is further preferred to set one cycle period (each of Prd1 and Prd2 in FIG. 17) to be at most 1/30 sec and the continuous lighting time of a light source to be at most 1/60 sec or shorter.

This embodiment is different from the embodiment of FIGS. 14 and 15 in that an anti-ferroelectric liquid crystal is used and, corresponding thereto, in a period Prd2, the voltage Vv is inverted from the one used in the preceding period Prd1. The anti-ferroelectric liquid crystal can provide two thresholds due to a hysteresis in opposite polarities but, even if the polarity of the voltage Vv is inverted, the optical state of the liquid crystal is identical as shown at Tran. A chiral smectic liquid crystal shows a fast speed of transition between two molecular orientation states (switching speed) and may be a liquid crystal optimally used in the present invention inclusive of the present embodiment.

As described above, in this example, the time of $V_{aflc}$ subsiding below the threshold is changed depending on gradation data. Further, the time of turning on a light source is determined so that the lighting period of the light source does not overlap with the reflection period (ON period) of the liquid crystal device corresponding to the gradation data giving a minimum level of reflectance.

In the present invention, it is possible to use a two-dimensionally extending device in which a large number of optical modulation elements each functionally equivalent to an light-transmission device (optical shutter) or a light-reflection device as described in the above-mentioned embodiment are arranged in a two-dimensional matrix. Instead of such a two-dimensional matrix device. it is also possible to use a planar optical modulation device having a two-dimensional extension, each local region (domain) of which functions equivalently as an optical modulation device or element as described above.

More specifically, it is possible to use a panel having a two-dimensional extension along which a multiplicity of transmission-type or light emission-type pixels are arranged and a DMD including a multiplicity of micromirrors arranged in a matrix.

Next, a driving method for an image display apparatus according to the present invention will be described.

Figure 18:
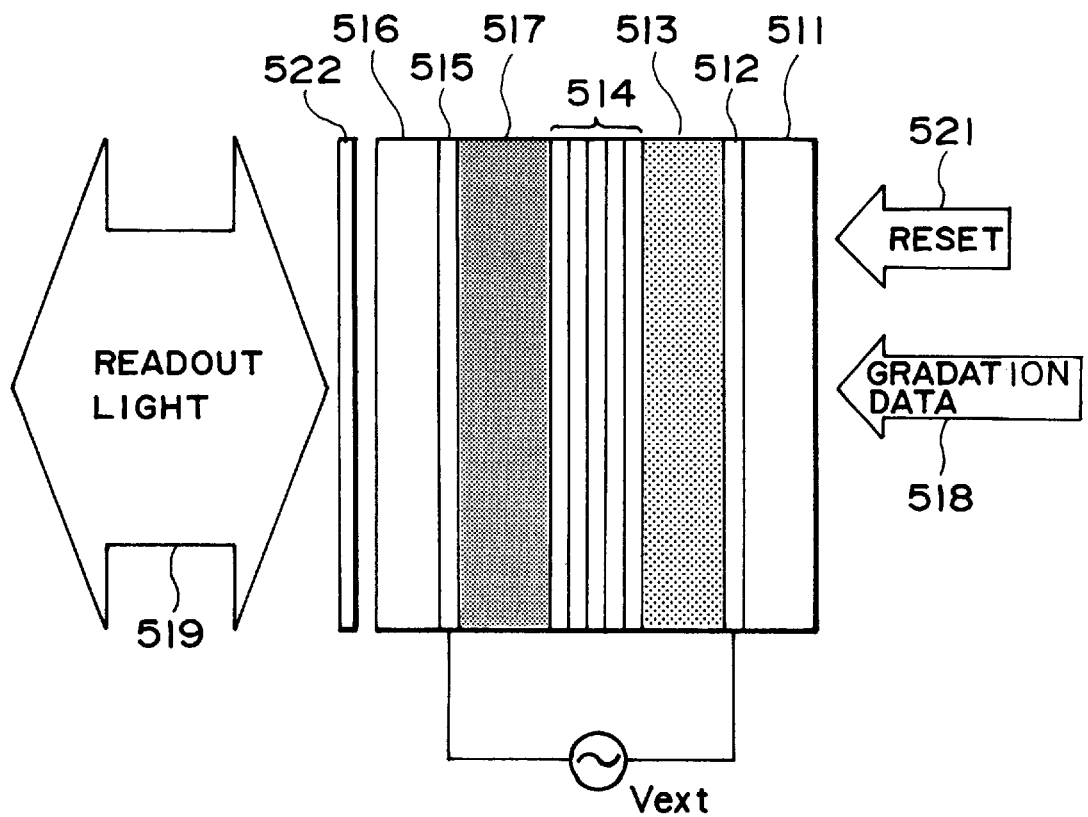
FIG. 18 is a schematic sectional view of an optical modulation device for an image display apparatus used in the invention.

FIG. 18 is a sectional view of an optical modulation device used in an image display apparatus according to an embodiment.

FIGS. 19A and 19B schematically show two molecular orientation states (optical states) of a chiral smectic liquid crystal used in the device. FIG. 20 is a graph showing an electrooptical characteristic of the device including the two optical states.

Before describing the embodiment of the present invention, a basic operation of the device shown in FIG. 18 is described. FIG. 21 is a time chart for illustrating the basic operation of the device.

The device shown in FIG. 18 constitutes a so-called reflection-type liquid crystal panel. In the device, a transparent substrate 511 is successively provided thereon with a transparent electrode 512, a photoconductor layer 513 as a photosensitive layer, and a dielectric multi-layer film 514 as a reflection layer. The other transparent substrate 516 is provided with a transparent electrode 515. Between the two substrates, a chiral smectic liquid crystal (sometimes abbreviated as "FLC") 517 as an optical modulation substance is disposed. A polarizer 522 is further disposed on the light incidence side. While not shown in the figure, alignment films for aligning liquid crystal molecules are disposed at boundaries of the liquid crystal layer 517 with the electrode 515 and the reflection layer 514. An external voltage application means $V_{ext}$ is connected to the electrodes 512 and 515 so as to apply a voltage between the electrodes. The device thus constituted is illuminated with reset light 521, writing light 518 carrying gradation data and readout light 519 for reading out the modulated gradation data, i.e., the image.

The device may be represented by an equivalent circuit shown in FIG. 6.

FIG. 19A shows a first orientation state (optical state) of a liquid crystal molecule MOL, and FIG. 19B shows a second orientation state (optical state) of the molecule MOL. When the liquid crystal in the first orientation state (FIG. 19A) is supplied with a voltage +Vu, the liquid crystal is switched to the second orientation state (optical state) (FIG. 19B). The resultant second orientation state (FIG. 19B) is retained even if the voltage is zero, i.e., placed under no electric field. Then, if a reverse polarity voltage −Vu is applied to the liquid crystal, the liquid crystal is switched to the first orientation state (FIG. 19A) which is retained even after removal of the electric field. The switching may also be called a transition or inversion of the liquid crystal. The first and second orientation states shown in FIGS. 19A and 19B are both stable, and the liquid crystal therefore has a memory characteristic.

The states shown in FIGS. 19A and 19B are optically different states (different optical states) so that one may be placed in a maximum transmittance state and the other in a minimum transmittance state by appropriately combining a polarizer. Herein, the voltage value Vu is used for denoting voltage exceeding a saturation voltage which is assumed to be substantially identical to the inversion threshold voltage.

Now, the operation of the device will be described. For easier comprehension of the operation principle, it is assumed that the capacitance $C_{flc}$ of the liquid crystal layer 517 and the capacitance $C_{PC}$ of the photoconductive layer 513 are identical to each other, the liquid crystal layer 517 has an infinitely large resistance, and the reflection layer 514 has an impedance of zero. Referring to FIG. 21, 521T and 518T respectively represent the illumination time of reset light 521 illuminating the photoconductor layer 513 and the illumination time of the writing light 518 illuminating the photoconductor layer 513 and having an intensity varying depending the gradation data. $V_{ext}$ represents an alternating voltage applied to the transparent electrodes 512 and 515 on both sides of the device, and $V_{flc}$ represents an effective voltage applied by voltage division on both sides of the liquid crystal layer 517. +Vu and −Vu represent voltages for causing the inversion from the first to second state and from the second to first state, respectively, of the liquid crystal as shown in FIG. 20. Tran represents orientation states (first and second) of FLC. In this embodiment, it is assumed that the polarizing device 522 functioning as both a polarizer and an analyzer is positionally adjusted so that the first orientation state (optical state) provides a dark state of the lowest transmittance and the second orientation state (optical state) provides a bright state of the highest transmittance. 504T represent the lighting time of readout light 519 illuminating the liquid crystal layer 517, and 505T represents a level of output light formed by passing the readout light through the polarizer 522, the liquid crystal 517, the reflection layer 517 and the analyzer 522.

Referring to FIG. 21, in a reset period of from time $t_{50}$ to $t_{51}$, $V_{ext}$ (a voltage level supplied from a voltage supply $V_{ext}$) assumes a voltage −$V_1$ and the photoconductor layer 513 is illuminated with reset light, whereby photocarriers (electron-hole pairs) are generated in the photoconductor layer 513 and the electrons and holes move in opposite directions under an electric field applied by voltage division to the photoconductor layer to be on both sides of the liquid crystal layer 517. As a result of this operation, $V_{flc}$ approaches the potential −$V_1$. As an explanation based on the equivalent circuit of FIG. 6, the voltage change may also be understood as a result of the phenomena that the resistance component in the photoconductor layer is lowered by a photoconductive effect to cause a self-discharge and a potential provided to the photoconductor layer by voltage division is lowered, whereby $V_{flc}$ approaches −$V_1$. When the reset light has a sufficient light intensity, $V_{flc}$ can be reset to −$V_1$ by the time $t_{51}$ regardless of the previous state, so that the first optical state (dark) of the liquid crystal is ensured. At time $t_{51}$, the reset light is turned off, $V_{ext}$ is changed to +$V_2$. At this time, potential $V_{flc}$ is changed by 1:1-capacitance division to $V_3=-V_1+(V_2-(-V_1))/2$. If no writing light is supplied as in the first period of this embodiment, $V_{flc}$ remains at $V_3$ until $t_{52}$, and the liquid crystal remains in the first optical state (dark) as $V_3<Vu$. Then, in a period after $t_{52}$, an operation similar to the one in the period of $t_{50}-t_{52}$ is performed while changing the polarity of $V_{ext}$. As a result, the integration of $V_{flc}$ in one (cycle) period provides a DC component of 0, so that an AC symmetry of drive waveform required for stable FLC drive is ensured. In a period of $t_{52}$ to $t_{53}$, $V_{flc}$ exceeds Vu to be reset at Vl so that the liquid crystal is inverted into the second optical state (bright).

In a second (cycle) period, the device is illuminated with writing light. The writing light has an intensity smaller than the reset light so that $V_{flc}$ approaches $V_{ext}$ at a slower time constant. In case where the writing light has a certain large strength or larger, $V_{flc}$ exceeds Vu at time $t_{x1}$ in a period T (of $t_{51}$ to $t_{52}$), when the liquid crystal is inverted from the first optical state to the second optical state. In case where the writing light is further intense as in a third period, the $T_{x1}$ becomes closer to $t_{51}$ so that the liquid crystal is inverted into the second optical state at an earlier time. In each of the second and third cycle periods, writing light similar to that used in the period of $t_{51}$ to $t_{52}$ is supplied in the period of $t_{53}$ to $t_{54}$ (i.e., $t_{50}$ in a subsequent cycle period), $V_{flc}$ subsides −Vu at time $t_{x2}$ whereby the liquid crystal is returned to the first optical state (dark). In any of the first–third periods, the AC symmetry of $V_{flc}$ is ensured and, in each period, the liquid crystal assumes the first optical state and the second optical state for 50% each of the period. As the writing light intensity increases, the second optical state of FLC is phase-shifted to be earlier.

In parallel with the above liquid crystal state change, readout light is supplied in a period of $t_{51}$ to $t_{52}$ in each cycle period, the observers recognize output light only for an overlapping period between a lighting period of the readout light and the second optical state (bright) period of FLC. As a result, no output light is given in the first cycle period but output light flux is increased as the writing light intensity is increased to provide longer overlapping periods as in the second and third cycle periods. The change in output light flux is recognized by the observer as a change in light intensity if each cycle period is set to be shorter than a period (e.g., 1/60 sec) of a minimum frequency giving a flicker noticeable to human eyes (i.e., a flickering frequency, e.g., 60 Hz).

On the other hand, if readout light is supplied in the period of $t_{53}-t_{54}$ instead of the period of $t_{51}-t_{52}$, the overlapping period is reduced to reduce output light reflux as the writing light intensity is increased. Accordingly, it is possible to effect a negative-positive exchange between the writing light and the readout light. Writing light may have a two-dimensionally planar spreading so that it is possible to form a planar potential distribution depending on the writing light intensity, thereby providing a so-called photo-writing-type spatial light modulation allowing a two-dimensional photo-writing and readout. As a result, it is possible to form a monochromatic film viewer.

Figure 22:
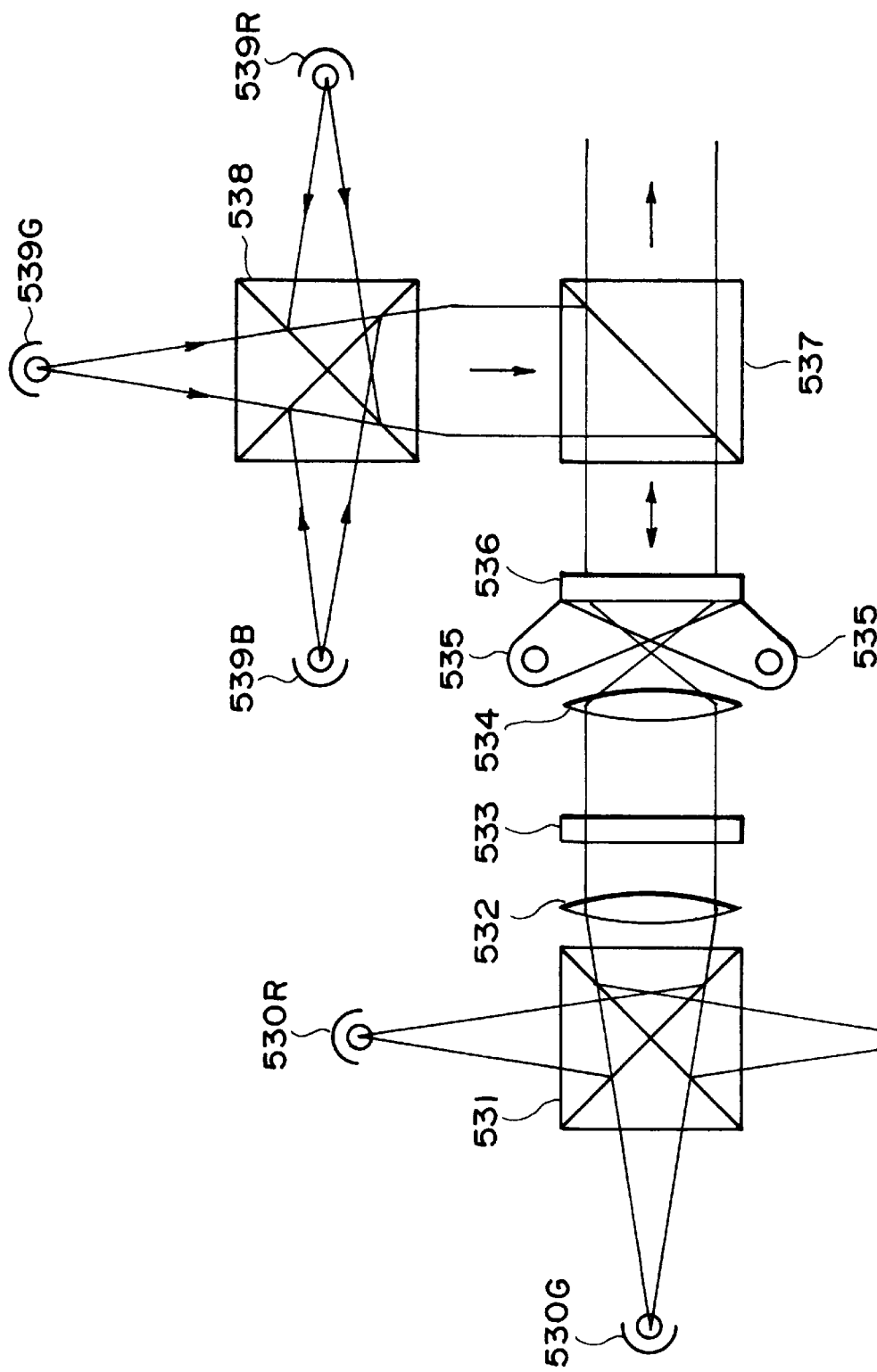
FIG. 22 is a schematic illustration of an image display apparatus illustrated for reference.

FIG. 22 is a system diagram of a full-color film viewer as an image display device including a photo-writing type spatial light modulator as described above.

The writing-side light source includes light emitting diodes (LEDs) in three colors of R, G and B.

More specifically, referring to FIG. 22, 530R denotes an R-writing light source LED; 530G, a G-writing light source LED; 530B, a B-writing light source LED; 535, a reset light source; and 531, a three-color mixing prism having an R-reflection surface and a B-reflection surface. The system further includes an optical modulation device, lenses 532 and 534, a film 533, and a prism 537. The system further includes a readout light source system including an R-readout light source LED 539R, a G-readout light source LED 539G, a B-readout light source LED and a three-color mixing prism 538 having an R-reflection surface and a B-reflection surface.

Figure 23:
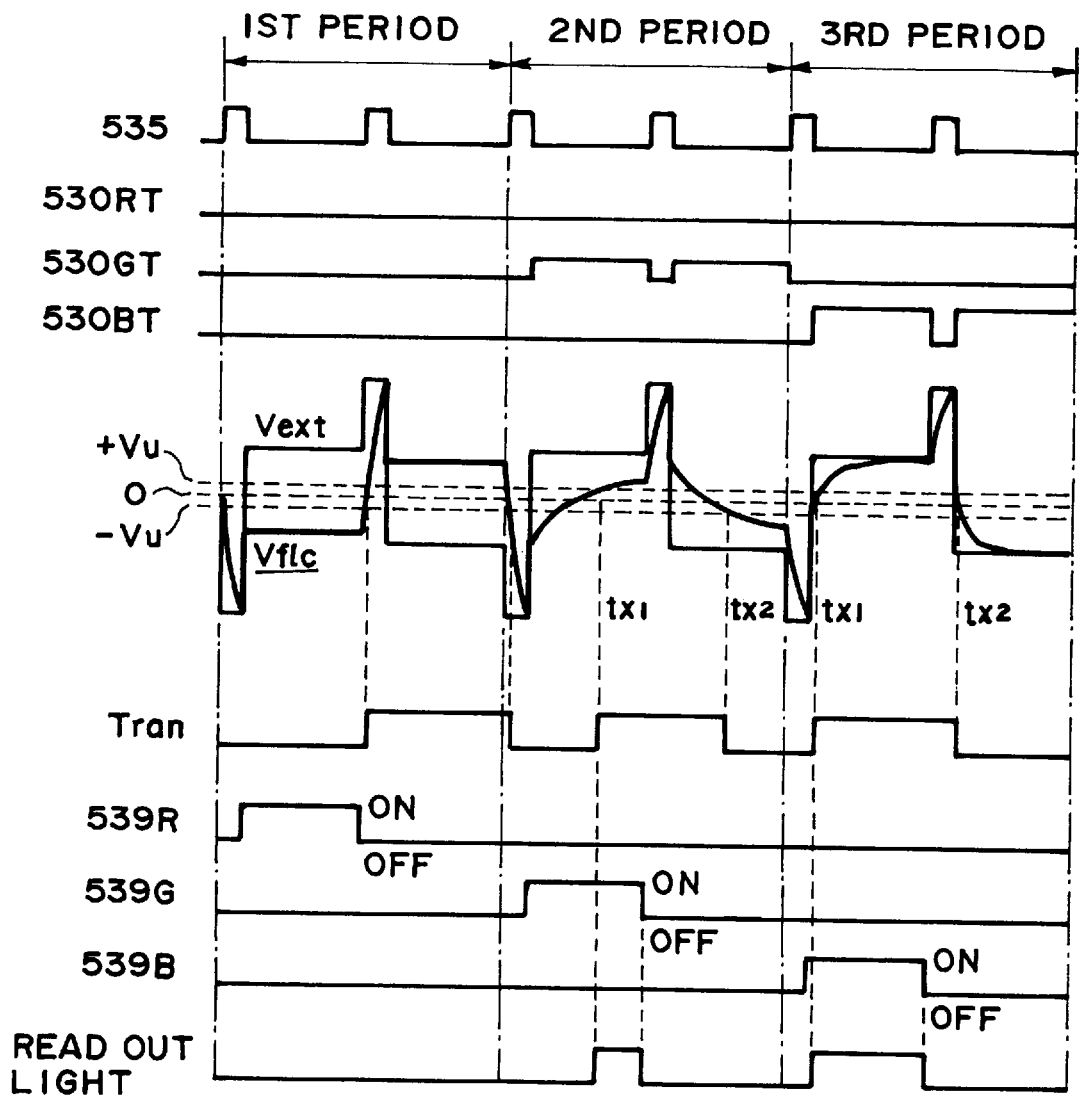

The operation of the system of FIG. 22 will be described with reference to FIG. 23.

Each cycle period is set to be at most ca. 5 msec (=1/flickering frequency/3). The writing light sources 530R, 530G and 530B are sequentially turned on each for one cycle period. On the other hand, the readout light sources 539R, 539G and 539B are sequentially turned on in synchronism with the writing-side light sources. The film 533 carries image data which is assumed to include gradation data represented by transmittances of 0% for R, 50% for G and 100% for B.

During the three cycle periods, additive color mixing is effected to provide a full-color output.

As already described, by changing the lighting time for the readout light sources, the system can be applied to either a positive film or a negative film as the film 533.

If a color filter-equipped transmission-type liquid crystal TV is used in place of the film 533 and in combination with a combination of a halogen lamp and a color-rotation filter as a brighter readout light source, the system may provide a motion picture projector.

Incidentally, in the case of constituting a monochromatic OHP (overhead projector) including monochromatic writing, for example, the reset light can be omitted if the writing light quantity for a specific pixel region is not changed.

It is sufficient that the reset light has at least a certain intensity, so that writing can be performed superposedly in the reset period without problem.

Further examples of photo-writing-type film viewer will be described with reference to FIGS. 24 and 25.

The optical system constituting the image display apparatus according to these embodiments is equal to the one shown in FIG. 22, and the optical modulation device is one having a structure as shown in FIG. 18, so that further description thereof will be omitted.

FIG. 24 is a time chart for driving an image display apparatus including the optical modulation device shown in FIG. 18.

The basic operation is identical to the one in the example of FIG. 21 but different in that the writing light 518T is supplied only in a period of $t_{61}$–$t_{62}$, i.e., a former half of a writing period and turned off in a remaining period (i.e., a latter half of the writing period) in each cycle period. Light supplied in a period of $t_{61}$–$t_{62}$ does not contribute to readout. On the other hand, in a period of $t_{62}$–$t_{63}$, i.e., the latter half of the writing period, uniform bias light 550T is supplied. In case where the writing light 518T carrying gradation data is zero as in a first cycle period, the voltage applied to the liquid crystal is constant at $-V_6$ throughout a period of $t_{61}$–$t_{62}$. Then, when the bias light 550T is supplied at time $t_{62}$, the voltage $V_{flc}$ applied to the liquid crystal is increased in a positive direction due to a lowering in resistance of the photoconductor layer 513. In this example, the value of $R_{PC}$ or $C_{PC}$ (FIG. 6) and time $t_{63}$ are adjusted so that the voltage $V_{flc}$ does not exceed the threshold (+Vu) of the liquid crystal even at the time $t_3$ in case where the writing light is at the minimum level. Accordingly, as the writing light is 0, i.e., at the minimum level, the output light (505T) is also 0, at the minimum level.

In a period of after $t_{63}$ until $t_{60}$ in a subsequent cycle period, the liquid crystal is subjected to an inversion operation by application of an opposite polarity voltage. In this period, no readout light is supplied, so that no image data is reproduced or outputted.

In a second cycle period in which the writing light is at a medium level, the photoconductor layer 513 is caused to have a lower resistance, and the liquid crystal is supplied with a voltage higher than $-V_6$ in the positive direction.

In a period of $t_{62}$–$t_{63}$ in the second cycle period, the bias light 550T is similarly supplied, the voltage $V_{flc}$ applied to the liquid crystal is increased from the initial voltage higher than $-V_6$ to exceed the threshold (+Vu) of the liquid crystal at time $t_{x1}$ intermediate within a period of $t_{61}$–$t_{63}$ when the readout light is supplied, unlike in the first cycle period. As a result, the liquid crystal shows a maximum transmittance (Tran) in a period of $t_{x1}$–$t_{63}$, when the readout light is reflected by the reflection layer 514 of the device. Thus, the period for reflection of the readout light ($t_{x1}$–$t_{63}$) is modulated depending on the writing light quantity (518T). The remaining period after time $t_{63}$ is used for the inversion operation similarly as in the first cycle period.

In a third cycle period, a maximum level of writing light is supplied (518T). As a result, the voltage $V_{flc}$ applied to the liquid crystal exceeds the threshold +Vu already at the first time point $t_{62}$ when a period of $t_{62}$–$t_{63}$ for bias light supply is started. Accordingly, during the whole period of $t_{62}$–$t_{63}$ wherein the readout light is supplied, the liquid crystal exhibits a maximum transmittance. As a result, the time integration of the reflected light quantity of the readout light incident to the device and reflected in a prescribed direction becomes maximum.

As described above, the readout light reflection time is determined depending on the writing light quantity so that, if the writing light quantity is changed in an analog manner, the reflection time is changed in an analog manner following the writing light quantity change.

In the period of $t_{63}$–$t_{60}$ for inversion operation in each cycle period, the polarity of the applied voltage $V_{ext}$ is inverted and the writing light and the bias light are supplied in identical light quantities as in the writing period. As a result, the time integration of effective voltage applied to the liquid crystal in one cycle period becomes 0, so that the deterioration of the liquid crystal is suppressed.

In this example, the bias light quantity level may be appropriately determined in view of the time constant of the photoconductor layer 513 and the length of the period of $t_{60}$–$t_{63}$. The light source of the bias light may be identical to or different from the one of the reset light. It is, however preferred that the bias light source and the reset light source are respectively provided with a dimmer means so as to allow independent light quantity control.

In this example, a good halftone display free from flickering may become possible if each cycle period is set to ca. 1/30 sec. or shorter and the period of $t_{60}$–$t_{63}$ is set to ca. 1/60 sec. or shorter.

In a further example, the previous example is modified so that the readout light source and the writing light source are respectively replaced by independently driven three color light sources of R, G and B, the first cycle period is allotted to writing and readout periods for R, the second cycle period is allotted to writing and readout periods for G, and the third cycle period is allotted to writing and readout periods for B, thereby effecting an image reproduction according to full-color optical modulation.

FIG. 25 is a time chart for driving the image display apparatus including the optical modulation device according to still another example.

The basic operation is identical to the one in the previous example of FIG. 24 but different in that the bias light illumination is replaced by increasing the voltage $V_{ext}$ applied to the device in a period of $t_{72}$-$t_{73}$.

In a period of $t_{70}$-$t_{71}$, reset light is supplied (721T). At this time, $V_{ext}$ is 0.

At time $t_{71}$, $V_{ext}$ is changed to a threshold value $+Vu$ of the liquid crystal but a voltage $V_{flc}$ applied to the liquid crystal becomes a lower voltage $+Vuu$ as the writing light (718T) applied to the photoconductor layer 513 is at a minimum level (=0). In case where the photoconductor layer 513 and the liquid crystal layer 517 have equal capacities, $+Vuu$ becomes equal to $Vu/2$.

At time $t_{72}$, the writing light (718T) is made 0, and the voltage $V_{ext}$ applied to the device is gradually increased with time up to $+Vem$ at time $t_{73}$. Correspondingly, the voltage $V_{flc}$ applied to the liquid crystal is increased.

In this instance, if $+Vem$ is set to be twice $+Vu$, $V_{flc}$ is caused to reach $+Vu$ at time $t_{73}$. As a result, in a period of $t_{72}$-$t_{73}$, the liquid crystal does not cause a switching of optical states, thus not showing a maximum transmittance state, while readout light is kept ON (704T).

The remaining period of $t_{73}$-$t_{70}$ is for inversion operation, during which image reproduction is not effected as the readout light is not supplied.

In a second cycle period, a medium level writing light illumination is performed (718T). As a result of the previous inversion operation, the liquid crystal is placed in a non-light-transmissive state at time $t_{70}$. As $V_{ext}$=0, $V_{flc}$ approaches a voltage level of 0.

At time $t_{71}$, $V_{ext}$ is made equal to the threshold $+Vu$, and the readout light is turned on (704T). As a result of the application of $V_{ext}$, $V_{flc}$ is increased but does not reach the threshold $+Vu$.

At time $t_{72}$, $V_{ext}$ begins to increase, so that $V_{flc}$ increases correspondingly to exceed the threshold $+Vu$ at time $t_{x1}$, when the liquid crystal is switched to an optical state showing a maximum transmittance. Accordingly, at this time $t_{72}$, the readout light already turned on is allowed to be incident to the reflection layer 514 through the liquid crystal layer 517 and reflected thereat to provide a recognizable reflected image. Thus, the reflection time $t_{x1}$-$t_{73}$ is modulated depending on the writing light quantity. A period after time $t_{73}$ is for the inversion operation.

In a third cycle period, the writing light is supplied at a maximum light quantity level. The operation in a period of $t_{70}$-$t_{71}$ is identical to the one in the first and second cycle periods described above.

As a result of illumination with a writing light started at time $t_{71}$, $V_{flc}$ reaches the threshold $+Vu$ at time $t_{72}$. Accordingly, during a readout light lighting period of $t_{72}$-$t_{73}$, the liquid crystal is held in an optical state of a maximum transmittance, so that the readout light is reflected by the device for a maximum period (705T).

As described above, the readout light reflection time is determined depending on the writing light quantity so that, if the writing light quantity is changed in an analog manner, the reflection time is changed in an analog manner following the writing light quantity change.

In the period of $t_{73}$-$t_{70}$ for inversion operation in each cycle period, the polarity of the applied voltage $V_{ext}$ is inverted and the writing light and the bias light are supplied in identical light quantities as in the writing period. As a result, the time integration of effective voltage applied to the liquid crystal in one cycle period becomes 0, so that the deterioration of the liquid crystal is suppressed.

In this example, the rate of $V_{ext}$ change with time may be appropriately determined in view of the time constant of the photoconductor layer 513 and the length of the period of $t_{71}$-$t_{73}$.

In this example, a good halftone display free from flickering may become possible if each cycle period is set to ca. $\frac{1}{30}$ sec. or shorter and the period of $t_{70}$-$t_{73}$ is set to ca. $\frac{1}{60}$ sec. or shorter.

[Embodiments]

Now, First Embodiment of the present invention will be described. In the reference examples with reference to FIG. 22, a two-dimensional image carrying gradation data on a film, etc., is written in a photoconductor layer of a liquid crystal device as an optical modulation device by basically a single time of writing light illumination. In this embodiment, a two-dimensional image is written in a liquid crystal device time-serially by vertical and horizontal scanning. The written gradation data may be read out by similarly scanning the liquid crystal device with readout light at appropriate timing.

FIG. 26 is a schematic plan view of a reflection-type liquid crystal device 801 having a chiral smectic liquid crystal layer and a photoconductor layer structurally identical to the one shown in FIG. 18 for illustration of a scanning scheme. The liquid crystal device is scanned with horizontally scanning writing light 802 while gradually shifting the horizontally scanning light downwards in a non-interlaced manner similarly as in an ordinary scanning on a CRT. In other words, the photoconductor layer is time-serially irradiated or illuminated with writing light. On the other hand, readout light 803 is caused to illuminate portions of the liquid crystal layer corresponding to the written positions of the photoconductor layer also for only a prescribed period for reproducing gradation data. Thus, the illumination of the device with readout light is performed also time-serially. The scanning with the readout light 303 is performed after the scanning with the writing light 802.

Figure 27:
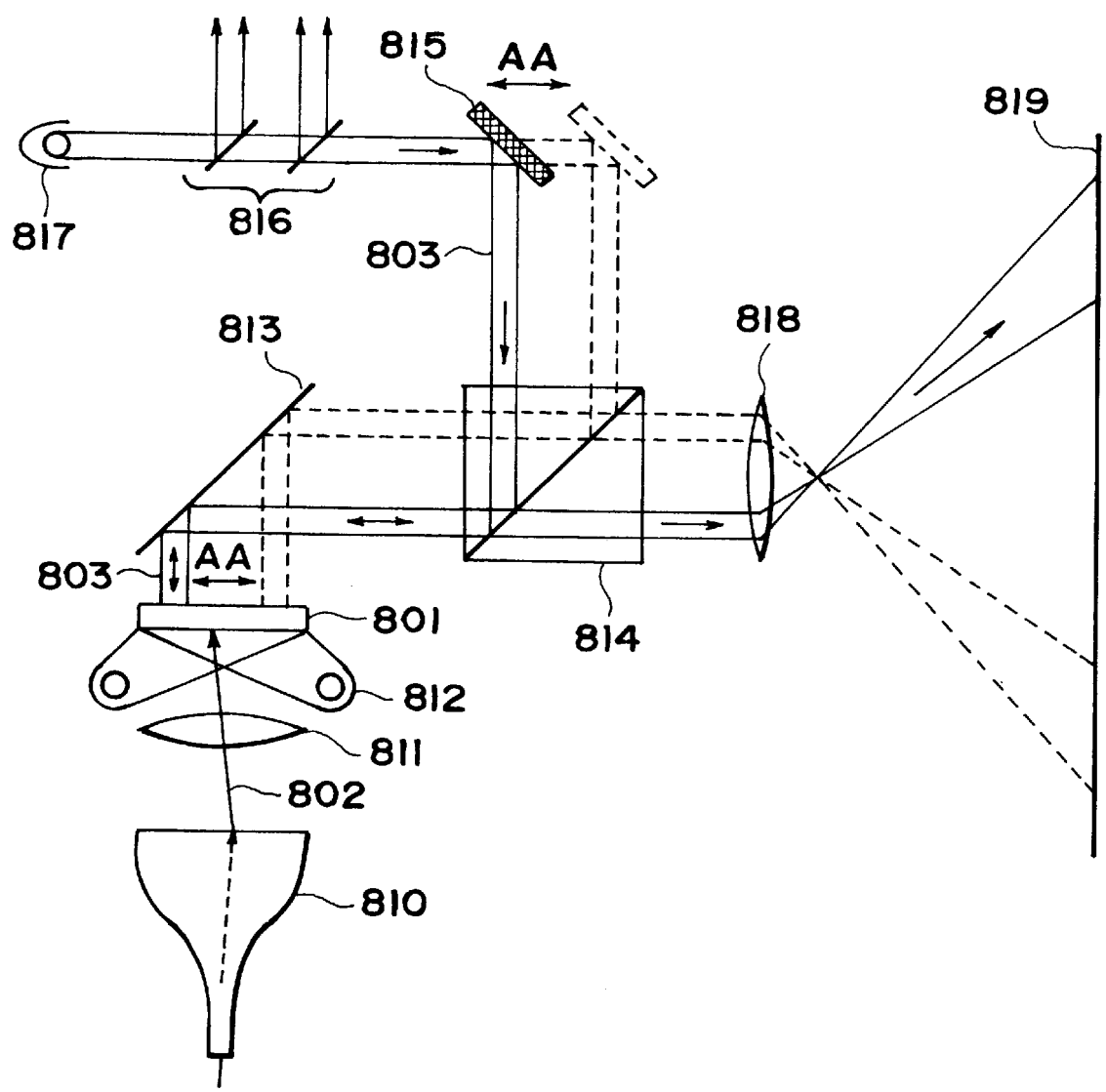
FIG. 27 is an illustration of an embodiment of the display apparatus according to the invention.

FIG. 27 illustrates an image display system according to this First Embodiment including a CRT (cathode ray tube) 810 as a writing light source, an image-forming lens 811, a reset light source 812, a mirror 813, a polarization beam splitter 814, a movable mirror 815, a filter 816 for cutting out infrared rays and ultraviolet rays, a readout light source 817, an illumination lens 818, and an image reproduction screen 819.

The readout light scanning means may be constituted by a combination of a fixed mirror and a movable light source 817 instead of the movable mirror 815 or by a combination of a movable mirror and a movable light source.

Also the writing light source need not be restricted to a CRT but can be constituted by using a movable mirror or a movable light source similarly as the readout light scanning means. In order to write in a high-resolution image, it is preferred to use a writing light source allowing two-dimensional scanning of a light beam like a CRT.

The reset light source 812, the lens 811, the filter 816, etc., may be used as described and can be omitted.

(Second Embodiment)

Figure 28:
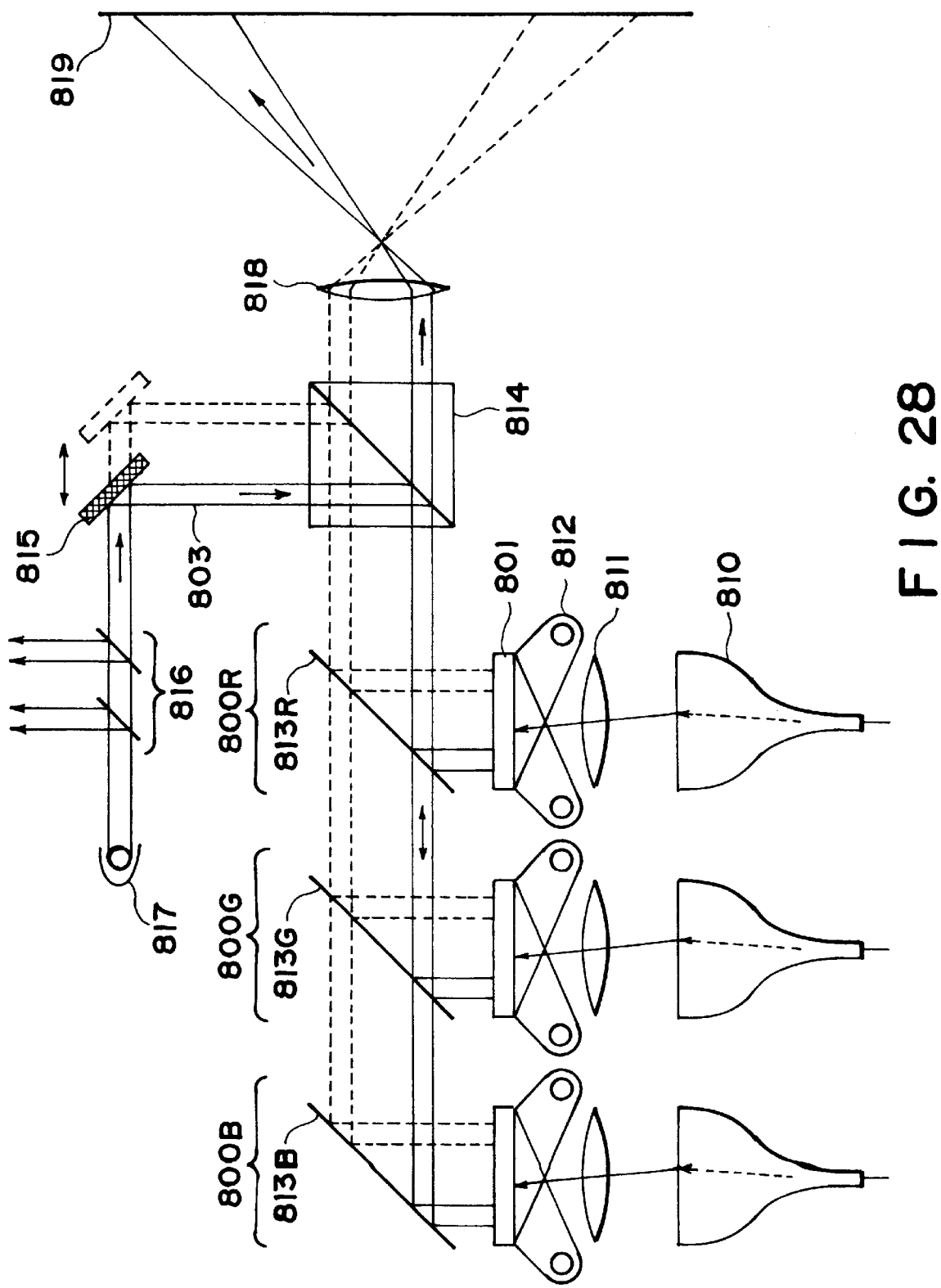
FIG. 28 is an illustration of another embodiment of the display apparatus according to the invention.

FIG. 28 illustrates another display system which is different from the one shown in FIG. 27 in that it includes a plurality of writing light illumination means 810–812 and a plurality of optical modulation devices 801, and readout light is divided into spectra by mirrors 813R, 813G and 813B.

In this system, white light may be divided into. e.g., R, G and B lights which are incident to the respective optical modulation devices 801 to take out reflected lights which are respectively modulated by light data written in the respective optical modulation devices 801. In this case, the readout light source can also be divided into a plurality so that one readout light source is allotted to each writing light source, and the optical modulation devices provided for respective colors are illuminated by writing light and readout light for each color. In the case of using a white light source, the scanning timing of readout light is simultaneous for the respective colors so that an image free from color deviation can be obtained. On the other hand, in the case of using readout light sources for respective colors, the respective color light sources can be controlled independently so that the adjustment of color balance becomes easy.

Figure 29:
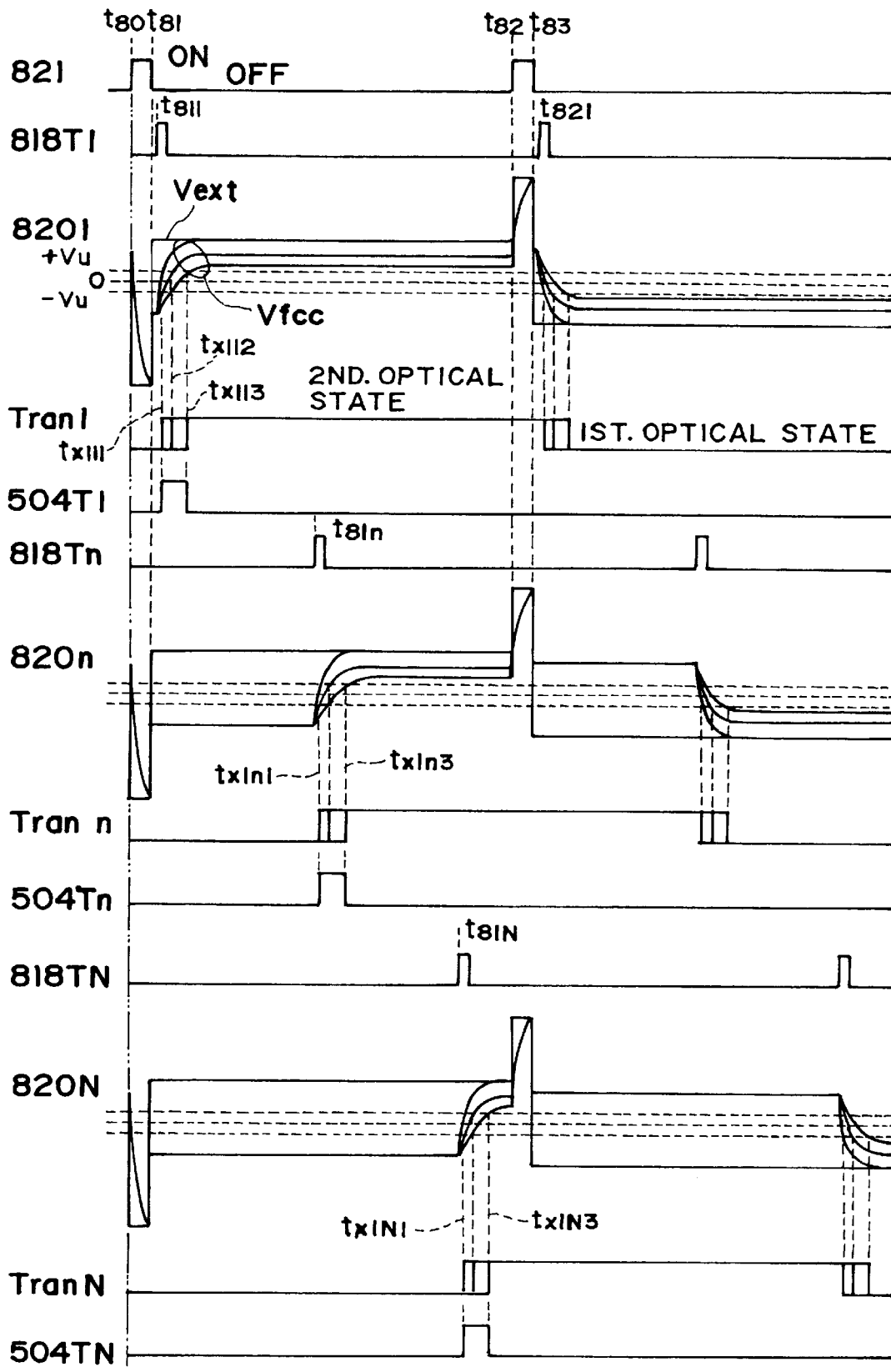
FIG. 29 is a time chart for illustrating an operation of an embodiment of the display apparatus according to the invention.

FIG. 29 is a time chart for more specifically describing the above-explained First Embodiment or Second Embodiment. FIG. 29 illustrates an operation in one cycle period while an operation in three cycle periods has been described in the example of FIG. 21.

At 821 is shown an operation of reset light similarly as the one at 521 in FIG. 21. In a period of $t_{80}$–$t_{81}$, the reset light illuminates the optical modulation device.

Waveforms at 818T1, 8201, Tran1 and 504T1 are shown to illustrate an operation at a first pixel which is first written by the writing light 802 according non-interlaced scanning.

At 818T1 is shown operation time of the writing light 802 incident to the first pixel. At time $t_{811}$ when the first pixel is illuminated with the writing light 802, electron-hole pairs having an electric charge $\Delta Q$ proportional to the writing light intensity thereof are generated to cause a potential change $\Delta V = \Delta Q/C$. At a stronger writing light intensity, $V_{flc}$ exceeds Vu in a shorter time to cause an optical state change of FLC from a dark to a bright state. In other words, a writing light intensity-FLC phase conversion is performed.

FIG. 29 illustrates three cases, i.e., a case where writing light is imparted at a maximum intensity so as to take out a maximum light quantity, a case where writing light is imparted at a certain offset light intensity so as to provide a dark display state, and a case where writing light is imparted at a medium light intensity so as to take out an intermediate light quantity.

As shown at Tran1, FLC causes a state change into a second optical state (bright) at time $t_{x111}$ in the case where writing light is imparted at the maximum intensity, and at time $t_{x113}$ in the case where a minimum level of writing light is imparted at a certain offset light intensity.

At 504T1 is shown an operation of readout light incident to the first pixel. When the first pixel is illuminated with the readout light for a period of $t_{x11}$ to $t_{x113}$, an observer can recognize light for a period of overlapping between the readout light illumination time and the second optical state (bright) time of FLC. If the writing in and the readout from the first pixel are repeated in a cycle period shorter than that corresponding to a flickering frequency, the overlapping period change is recognized by the observer as a light intensity change at the first pixel.

Similarly as above, waveforms at 818Tn, 820n, Trann and 504Tn are shown to illustrate an operation at an n-th pixel which is placed at a nearly central point in a picture area which is written in by the non-interlaced scanning mode.

Further, waveforms at 8181TN, 820N, TranN and 504TN are shown to illustrate an operation at an N-th pixel which is written last with the writing light 802 by the non-interlaced scanning therewith.

The operations of the respective pixels are similar to that of the first pixel, whereas the n-th pixel is written at time $t_{81n}$ and the N-th pixel is written at time $t_{81N}$.

After being illuminated with reset light, the device 801 is scanned with writing light 802. In synchronism therewith. the device 801 is supplied with a reset voltage and writing voltages sequentially. As a result, the liquid crystal is supplied with an effective voltage which varies with time depending on illuminated light quantity due to light absorption by the photoconductor layer, so that the liquid crystal causes an optical state change at different points of time when the effective voltage exceeds the threshold, thereby providing different periods of time when the liquid crystal is placed in a reflection state depending on given gradation data. In appropriate overlapping with the periods of reflection state, the liquid crystal is scanned with the readout light 803. In this embodiment, the scanning is performed by movement of the movable mirror 815. More specifically, when the movable mirror 815 is moved in arrow AA directions, the readout light 803 illuminating the device 801 moves in arrow AA directions on the liquid crystal device, so that the device 801 is vertically scanned with stripe-form readout light. One horizontal scanning period of the readout light 803 may be set to 1/60 sec or shorter so as to allow the recognition of a halftone. The scanning movements of the movable mirror 815 and the CRT 810 are synchronized with each under by means of a control circuit (not shown). It is particularly preferred to control the light source and the scanning means so that the lighting and/or illumination is performed in synchronism with and only for a modulatable period $t_{x111}$–$t_{x113}$ which is determined by the rise time. The electrooptical properties of the optical modulation device 801 may preferably be determined so as to set the period $t_{x111}$–$t_{x113}$ to be at most 1/60 sec.

The operation of an optical modulation device for effecting gradational display may be performed as described with reference to FIGS. 1–25, more specifically based on principles described with reference to FIGS. 11, 21 and 23–25. Accordingly, the drive schemes described with reference to these figures may be combined with scanning of readout light and writing light described with reference to FIGS. 26–29.

The above-mentioned Second Embodiment is a modification of First Embodiment so as to be applicable to full-color display, so that the writing light scanning means and the liquid crystal device 801 are provided for respective colors therefor, e.g., in three sets 800R, 800G and 800B for three colors of R, G and B, respectively.

The operation of the system shown in FIG. 28 is basically identical to that described with reference to FIG. 29 for the system of FIG. 27. If the writing light scanning timing is synchronized for the three colors, a full color display becomes possible according to additive color mixing. The thus-constituted display apparatus is suited for a full-color motion picture display and is therefore suitably used to constitute a large screen-size television system.

(Third Embodiment)

The above-described First and Second Embodiments have been described as using a non-interlaced scanning mode using a spot beam of writing light similarly as in a CRT, but it is also possible to effect a line-sequential writing scheme by using, e.g., a linear or two-dimensional LED array sequentially turned on and off.

(Fourth Embodiment)

Figure 30:
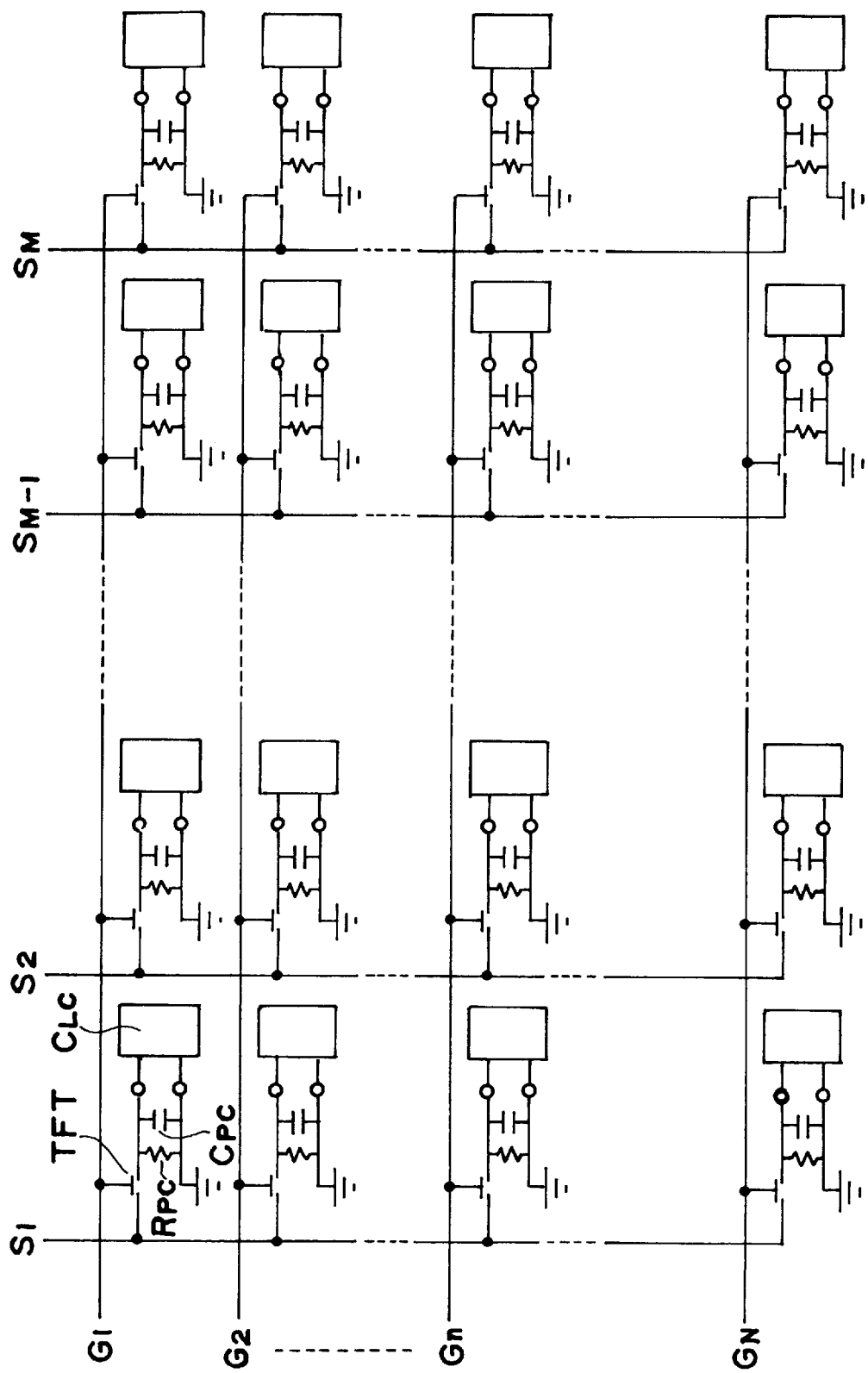
FIG. 30 is an equivalent circuit diagram of a optical modulation device in an embodiment of the display apparatus according to the invention.

FIG. 30 is an equivalent circuit diagram of a liquid crystal device used in this embodiment of the present invention, and FIG. 31 is a partial sectional view covering almost one pixel of the device shown in FIG. 30.

The device according to this embodiment is an active matrix-type liquid crystal device including a resistive element $R_{pc}$, a capacitive element $C_{pc}$ and a switch TFT for each pixel, and also an electrode matrix composed of N gate line (scanning lines) $G_1$–$G_N$ and M source lines (data lines) $S_1$–$S_M$. As shown in FIG. 30l, the device is provided by forming respective functional elements on a transparent substrate 901 and by sandwiching a liquid crystal layer 904 with the substrate 901 and a counter transparent substrate 902 carrying a common transparent electrode.

Each switch TFT comprises a gate electrode 906, a gate insulating film 908, a channel layer 914, ohmic layers 910 and 909 constituting a source and a drain, respectively, and source and drain electrodes 911 and 912.

The capacitive element $C_{pc}$ comprises the drain electrode 912, the ohmic layer 909, the insulating film 908, and a lower electrode 907.

The resistive element $R_{pc}$ comprises the drain electrode 912, the ohmic layer 909 and an electrode 913.

The gate electrode 906 and the lower electrode 907 may be formed of conductors deposited and patterned in common steps, and the channel layers 914 and 915 may be formed by semiconductors deposited and patterned in common steps.

The gate electrodes 906 are commonly connected for each row to provide gate lines $G_1$–$G_N$, and the source electrodes 911 are commonly connected for each column to provide source lines $S_1$–$S_M$.

The common electrode and the lower electrodes 907 for all the pixels are commonly connected to a reference power supply and is retained at a reference potential.

FIG. 31 is a ti me chart for illustrating an operation of the liquid crystal device. The source lines $S_1$–$S_M$ are supplied in parallel at a time with signals having voltages corresponding to gradation data and varying time serially, and the gate lines $G_1$–$G_M$ are sequentially supplied with signals for turning on the switch TFTs to effect a multiplex drive.

Readout light is caused to illuminate one row of pixels for a period $P_{ON}$ to effect scanning so as to follow the gate-ON signal.

The principle of gradational display is identical to the one described with reference to FIG. 15.

When a gate-ON signal is supplied. a switch TFT is turned on to supply a gradation signal voltage through the switch to raise a potential of the drain electrode 912 functioning as a pixel electrode. Due to a potential difference between the pixel electrode potential and a potential of the common electrode 903, the liquid crystal 904 is molecularly oriented into a light transmission state. The charge at the pixel electrode is discharged through the ohmic layer 909 as a resistive element $R_{pc}$, so that the potential of the pixel electrode 912 is gradually lowered. When the potential is lowered below the threshold, the liquid crystal is molecularly oriented into a light-interrupting state.

The time of the potential becoming below the threshold depends on the voltage applied to the source line and also on a time constant given by the resistive element $R_{pc}$ and the capacitive element $C_{pc}$. In synchronism with a modulatable range of the period of the liquid crystal assuming the light transmission state, the pixel is illuminated with readout light for a prescribed period (e.g., $\frac{1}{60} \times \alpha$) sec. The readout light may be in a stripe form and scanningly moved vertically to read out one frame of image data.

Figure 32:
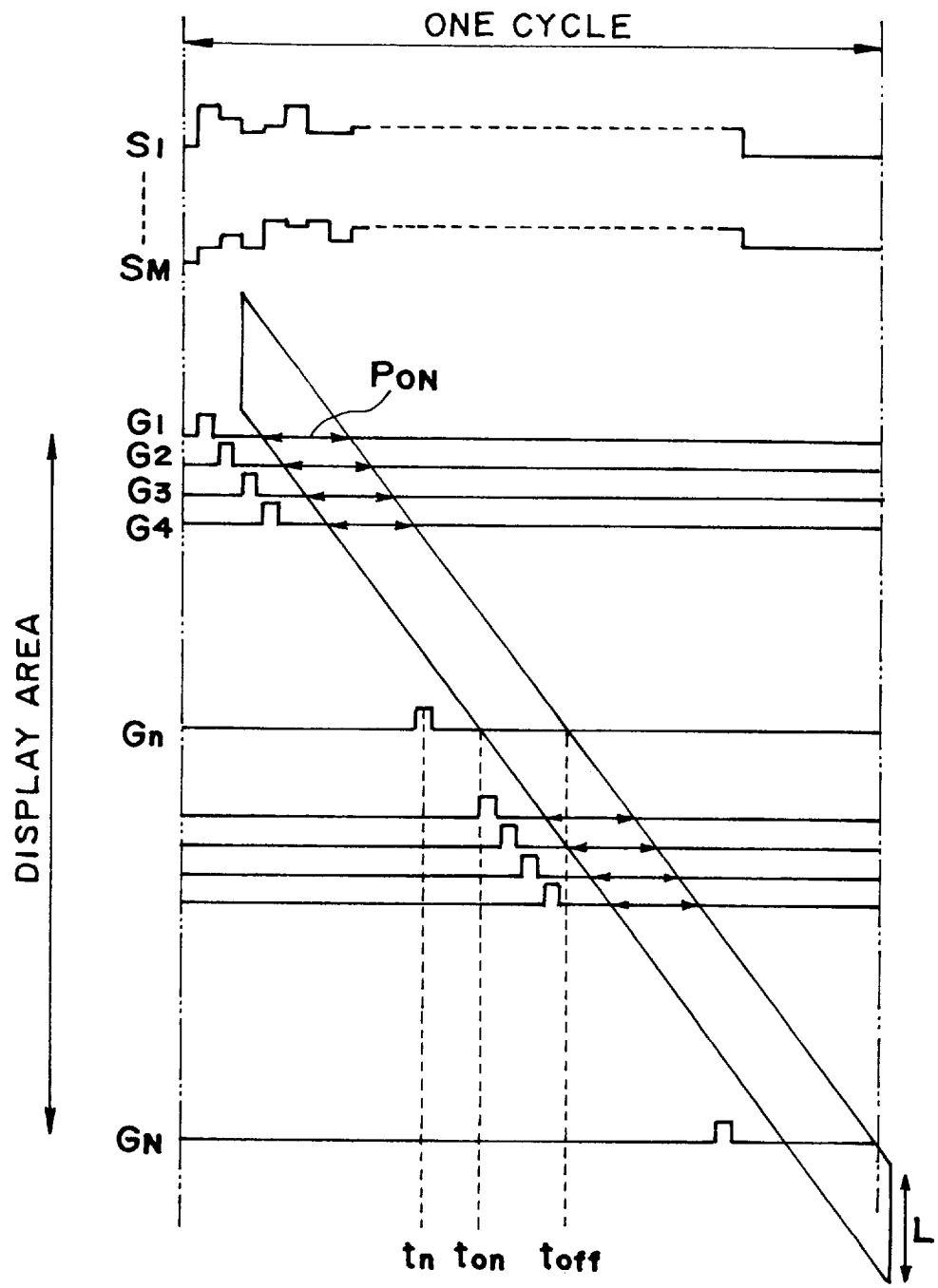
FIG. 32 shows a time chart for illustrating an operation of an embodiment of the display apparatus according to the invention.

In case where pixels on an n-th row are taken for example, the pixels are supplied with gradation signals at time $t_n$ and, after lapse of a period corresponding to several times the horizontal scanning period, started to be illuminated with readout light at time $t_{on}$ and ceased to be illuminated at time $t_{off}$. This operation is illustrated in FIG. 32.

The resistive element and the capacitive element used in the present invention are not restricted to those shown in FIGS. 30 and 31.

The gate electrode 906 and the source electrode 911 may comprise a metal such as Al, Cr, Cu, Mo, W or Ta, or an alloy of these metals. The pixel (drain) electrode 912 and the lower electrode 907 may comprise a transparent conductor, such as ITO, $SnO_2$ or InO.

The gate insulating film 908 may preferably comprise an insulating material, such as SiN, SiO, $Ta_2O_3$, or $Al_2O_3$. The channel layer 914 may preferably comprise amorphous silicon inclusive of high-resistivity non-single crystal silicon.

The ohmic layers 909 and 910 may preferably comprise low-resistivity amorphous silicon (inclusive of non-single crystal silicon), microcrystalline silicon or a mixture of these, doped with an atom selected from those belonging to the group V in the periodic table.

Figure 34:
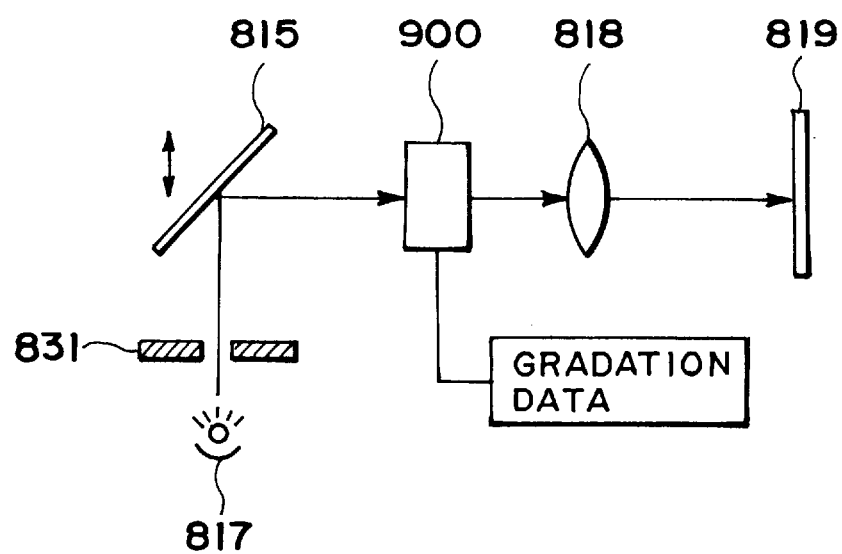
FIG. 34 is an illustration of an organization of an embodiment of the display apparatus according to the invention.

FIG. 34 illustrates an image display apparatus including a liquid crystal device 900 as described above, and also a readout light source 817, a movable mirror 815, a lens 818, a screen 819, and a stop 831.

Figure 33:
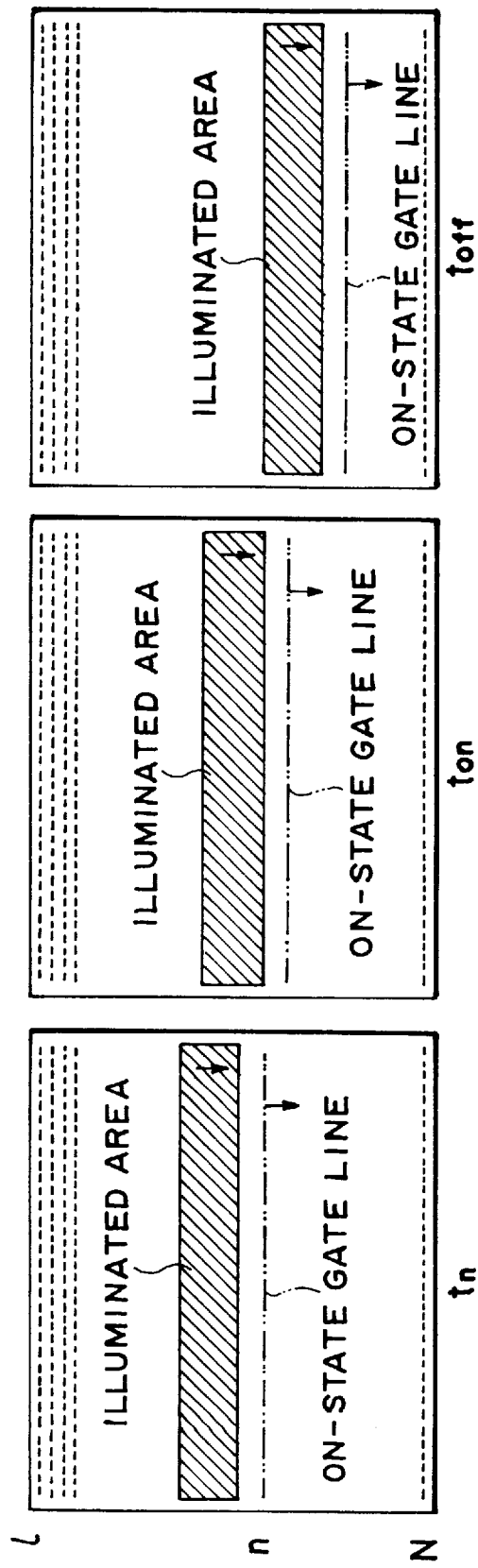
FIG. 33 is an illustration of a manner of scanning with readout light.

The readout light is converted into a stripe-form flux having a prescribed width through the stop 831 and is scanningly moved by the movement of the movable mirror 815 to illuminate the device 900 while following the movement of the turned-on gate lines as shown in FIG. 33.

What is claimed is:

1. A driving method for a display apparatus including an optical modulation device comprising a pair of electrodes, and a photoconductor layer and an optical modulation substance layer disposed between the electrodes, a signal light source for supplying light data carrying gradation data to the photoconductor layer, and a readout light source for supplying readout light for reading out image data to the optical modulation substance layer, said driving method comprising:

scanningly supplying the light data to the photoconductor layer, and scanningly supplying the readout light to the optical modulation substance layer, wherein a lighting time of the readout light source is controlled to modulate an overlapping time between a period of the optical modulation substance assuming a prescribed optical state and the lighting time depending on given gradation data.

2. A driving method according to claim 1, wherein a portion of the photoconductor layer is supplied with the light data as one horizontal scanning and thereafter a corresponding portion of the optical modulation substance layer is scanned with the readout light.

3. A driving method according to claim 1, wherein the signal light source supplies at least two types of light data having mutually different wavelength regions.

4. A driving method according to claim 1, wherein the signal light source supplies light data of red, green and blue.

5. A driving method according to claim 1, wherein the display apparatus includes a plurality of signal light sources and an equal number of optical modulation devices corresponding thereto.

6. A driving method according to claim 1, wherein the readout light is scanningly moved by a movable mirror.

7. A driving method according to claim 1, wherein the readout light is divided into spectra by means of a mirror selectively transmitting or reflecting a prescribed wavelength of light.

8. A driving method according to claim 1, wherein the display apparatus includes a CRT, a movable mirror and a polarization beam splitter.

9. A driving method according to claim 1, wherein the optical modulation device is supplied with reset light prior to the supply of the light data.

10. A driving method according to claim 1, wherein a reset voltage of one polarity is applied and then a writing voltage is applied between the pair of electrodes.

11. A driving method according to claim 1, wherein the optical modulation device includes a plurality of scanning lines and a plurality of data lines disposed to intersect the scanning lines so as to form a matrix of pixels each at an intersection of the scanning lines and the data lines, each pixel comprising the pair of electrodes, and the photoconductor layer and the optical modulation substance layer are disposed between the electrodes.

12. A driving method according to claim 11, wherein the pixels on all the scanning lines are simultaneously supplied with a reset voltage.

13. A driving method according to claim 11, wherein the photoconductor layer corresponding to the pixels or all the scanning lines is simultaneously supplied with reset light.

14. A driving method according to claim 11, wherein one horizontal scanning with the readout light is performed in synchronism with one horizontal scanning with the light data.

15. A driving method according to claim 1, wherein the readout light is supplied to a pixel for a period wherein the optical modulation substance in the pixel can change its optical state.

16. A driving method according to claim 1, wherein the optical modulation substance changes its optical state at a point in time which varies depending on the supplied light data within a period for supplying the readout light.

17. A driving method according to claim 1, wherein the optical modulation substance comprises a liquid crystal having a memory characteristic.

18. A driving method according to claim 1, wherein the optical modulation substance comprises a chiral smectic liquid crystal.

19. A driving method according to any one of claims 1–18, wherein the readout light is continuously supplied for a period of at most $1/30$ sec.

20. A driving method according to any one of claims 1–18, wherein the readout light is continuously supplied for a period of at most $1/60$ sec.

21. A driving method for a display apparatus including (a) an optical modulation device comprising a plurality of two-dimensionally arranged pixels, each comprising an optical modulation element formed by disposing an optical modulation substance layer between a pair of electrodes and a drive element for supplying an electric signal carrying gradation data to the optical modulation element, and (b) a readout light source for supplying readout light for reading out image data to the optical modulation substance layer, said driving method comprising:

supplying the electric signal to a scanningly selected pixel, scanning the pixels with readout light to supply the readout light to the optical modulation substance layer at the selected pixel, and controlling a lighting time of the readout light source to modulate an overlapping time between a period of the optical modulation substance assuming a prescribed optical state and the lighting time depending on given gradation data.

22. A driving method according to claim 21, wherein one horizontal row of pixels including the selected pixel are supplied with electric signals and thereafter the row of pixels is scanned with the readout light.

23. A driving method according to claim 21, wherein the drive element comprises a transistor.

24. A driving method according to claim 21, wherein the drive element comprises a transistor and a resistive element.

25. A driving method according to claim 21, wherein the drive element comprises a transistor, a resistive element, and a capacitive element.

26. A driving method according to claim 21, wherein the readout light is illuminated for a period longer than a scanning selection period of a pixel.

27. A driving method according to claim 21, wherein a point in time when a voltage applied to the optical modulation substance subsides below a prescribed value is modulated.

28. A driving method according to claim 21, wherein the drive element comprises a transistor connected to a pixel and having a source, a gate and a drain, and the electric signal is supplied to the source.

29. A driving method according to claim 20, wherein the readout light is supplied to a pixel for a period such that the optical modulation substance in the pixel can change its optical state.

30. A driving method according to claim 21, wherein the optical modulation substance changes its optical state at a point in time which varies depending on the supplied light data within a period for supplying the readout light.

31. A driving method according to claim 21, wherein the optical modulation substance comprises a liquid crystal having a memory characteristic.

32. A driving method according to claim 21, wherein the optical modulation substance comprises chiral smectic liquid crystal.

* * * * *

UNITED STATES PATENT AND TRADEMARK OFFICE
CERTIFICATE OF CORRECTION

PATENT NO. : 5,856,814
DATED : January 5, 1999
INVENTOR(S) : MINETO YAGYU Page 1 of 4

It is certified that error appears in the above-identified patent and that said Letters Patent is hereby corrected as shown below:

ON COVER PAGE AT [76] INVENTOR

"[76]  Inventor: Mineto Yagyu, c/o Canon Kabushiki Kaisha,
3-30-2 Shimomaruko, Ohta-ku, Tokyo, Japan"

should read

--[75]  Inventor: Mineto Yagyu, Sagamihara, Japan--.

ON COVER PAGE

Insert --[73] Assignee:   Canon Kabushiki Kaisha, Tokyo, Japan--.

COLUMN 4

Line 18, "a" should read --an--;
Line 44, "system" should read --a system--.

COLUMN 5

Line 27, "scheme," should read --schemes,--;
Line 29, "PWop" should read --Vop--.

COLUMN 6

Line 31, "subslides" should read --subsides--.

COLUMN 7

Line 13, "optically different two" should read --two optically different--.
Line 16, "my" should read --may--.

COLUMN 8

Line 20, "substrate" should read --substrates--;

UNITED STATES PATENT AND TRADEMARK OFFICE
CERTIFICATE OF CORRECTION

PATENT NO. : 5,856,814
DATED : January 5, 1999
INVENTOR(S) : MINETO YAGYU It is certified that error appears in the above-identified patent and that said Letters Patent is hereby corrected as shown below:

```
Line 23, "a" should read --and a--;
Line 24, "105." should read --104.--;
Line 36, "PED." should read --PED,--;
Line 39, "constitutes" should read --constitute--.
```

COLUMN 9

```
Line 47, "of" should read --of an--.
```

COLUMN 10

```
Line 34, "of" should read --of an--.
```

COLUMN 11

```
Line 12, "liauid" should read --liquid--;
Line 20, "of" should read --of an--.
```

COLUMN 12

```
Line 19, "an" should read --a--.
```

COLUMN 13

```
Line 51, "reflection layer 517" should read --reflection
    layer 514--.
```

COLUMN 14

```
Line 30, "Vflc subsides" should read --and Vflc subsides
    to--.
```

COLUMN 15

```
Line 45, "of" should read --of a--.
```

UNITED STATES PATENT AND TRADEMARK OFFICE
CERTIFICATE OF CORRECTION

PATENT NO. : 5,856,814
DATED : January 5, 1999
INVENTOR(S) : MINETO YAGYU Page 3 of 4

It is certified that error appears in the above-identified patent and that said Letters Patent is hereby corrected as shown below:

COLUMN 16

Line 57, "however" should read --however,--.

COLUMN 17

Line 1, "independently driven three" should read --three independently driven--.
Line 32, "while" should read --while the--.

COLUMN 18

Line 21, "Now," should read --Now, a--.

COLUMN 19

Line 38, "according" should read --according to--;
Line 63, "$t_{x11}$" should read --$t_{x111}$--.

COLUMN 20

Line 37, "under" should read --other--;
Line 54, "of" should read --of the--.

COLUMN 21

Line 19, "line" should read --lines--;
Line 45, "is" should read --are--;
Line 46, "ti me" should read --time--.

UNITED STATES PATENT AND TRADEMARK OFFICE
CERTIFICATE OF CORRECTION

PATENT NO. : 5,856,814
DATED : January 5, 1999
INVENTOR(S) : MINETO YAGYU It is certified that error appears in the above-identified patent and that said Letters Patent is hereby corrected as shown below:

<u>COLUMN 24</u>

Line 44, "20," should read --21--.

NY_MAIN 44525 v 1

Signed and Sealed this

Twelfth Day of December, 2000

Attest:

Attesting Officer

Q. TODD DICKINSON

Director of Patents and Trademarks